(12) United States Patent
Yanagida et al.

(10) Patent No.: US 9,975,537 B2
(45) Date of Patent: May 22, 2018

(54) RUNNING CONTROL DEVICE FOR VEHICLES

(71) Applicant: HONDA MOTOR CO., LTD., Tokyo (JP)

(72) Inventors: Hisanori Yanagida, Wako (JP); Noriaki Suzuki, Wako (JP); Tatsu Yoshida, Wako (JP); Yuki Yamamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 191 days.

(21) Appl. No.: 15/014,250

(22) Filed: Feb. 3, 2016

(65) Prior Publication Data

US 2016/0236672 A1   Aug. 18, 2016

(30) Foreign Application Priority Data

Feb. 18, 2015   (JP) .................................. 2015-029416

(51) Int. Cl.
*B60W 10/04* (2006.01)
*B60W 10/08* (2006.01)
(Continued)

(52) U.S. Cl.
CPC ............... *B60W 10/08* (2013.01); *B60T 1/10* (2013.01); *B60T 8/1755* (2013.01);
(Continued)

(58) Field of Classification Search
CPC .. B60L 7/26; B60L 2240/423; B60L 2250/26; B60L 15/2009; B60L 7/14; B60L 7/18; B60L 11/14; B60L 11/1861; B60L 2240/12; B60L 2240/461; B60L 2250/16; B60L 3/108; B60L 11/123; B60L 11/1803; B60L 15/20; B60L 2240/14; B60L 2240/421; B60L 2240/445; B60L 2240/465; B60L 2240/486; B60L 2240/80; B60L 2270/145; B60L 11/1868; B60L 15/025;
(Continued)

(56) References Cited

U.S. PATENT DOCUMENTS

2012/0109481 A1*   5/2012   Mitsuyasu ............... B60L 11/14
701/70
2014/0084673 A1*   3/2014   Matsuoka ............. B60T 8/4872
303/3
2014/0375115 A1*   12/2014  Ajiro ........................ B60T 1/10
303/152

FOREIGN PATENT DOCUMENTS

JP   2005-226671 A   8/2005
JP   2006-117020 A   5/2006
(Continued)

OTHER PUBLICATIONS

Office Action dated Aug. 23, 2016, issued in counterpart Japanese Patent Application No. 2015-029416, with English translation. (7 pages).

*Primary Examiner* — Jelani A Smith
(74) *Attorney, Agent, or Firm* — Westerman, Hattori, Daniels & Adrian, LLP

(57) ABSTRACT

A running control device changes the distribution of engine braking or regenerative braking and the distribution of friction braking in the entire requested braking force according to an operation amount of an operation element, according to whether the behavior of a vehicle during running is in a stable state or an unstable state, or becomes an unstable state in the near future with high probability.

11 Claims, 10 Drawing Sheets

(51) Int. Cl.

| | |
|---|---|
| *B60W 10/06* | (2006.01) |
| *B60W 10/10* | (2012.01) |
| *B60W 10/184* | (2012.01) |
| *B60W 30/02* | (2012.01) |
| *B60W 30/18* | (2012.01) |
| *B60W 20/14* | (2016.01) |
| *B60T 1/10* | (2006.01) |
| *B60T 13/58* | (2006.01) |
| *F16D 61/00* | (2006.01) |
| *B60T 8/1755* | (2006.01) |

(52) U.S. Cl.
CPC ........... *B60T 13/586* (2013.01); *B60W 10/06* (2013.01); *B60W 10/10* (2013.01); *B60W 10/184* (2013.01); *B60W 20/14* (2016.01); *B60W 30/02* (2013.01); *B60W 30/18127* (2013.01); *B60W 30/18136* (2013.01); *B60W 30/18145* (2013.01); *F16D 61/00* (2013.01); *B60T 2270/604* (2013.01); *B60T 2270/613* (2013.01); *B60W 2520/105* (2013.01); *B60W 2520/125* (2013.01); *B60W 2520/14* (2013.01); *B60W 2520/20* (2013.01); *B60W 2540/10* (2013.01); *B60W 2540/18* (2013.01); *B60W 2550/148* (2013.01); *B60W 2710/182* (2013.01); *B60Y 2300/89* (2013.01); *Y02T 10/6286* (2013.01)

(58) Field of Classification Search
CPC ............. B60L 15/2027; B60L 2220/14; B60L 2240/16; B60L 2240/18; B60L 2240/20; B60L 2240/22; B60L 2240/24; B60L 2240/429; B60L 2240/441; B60L 2240/463; B60L 2240/622; B60L 2240/68; B60L 2250/10; B60L 2260/42; B60L 2270/142; B60L 3/0015; B60L 3/0046; B60L 3/0076; B60L 3/10; B60L 3/102; B60L 7/12; B60T 1/10; B60T 2270/604; B60T 13/662; B60T 7/042; B60T 8/4081; B60T 13/686; B60T 13/586; B60T 2201/022; B60T 2220/04; B60T 7/06; B60T 7/12; B60T 7/22; B60T 8/4872; B60T 11/18; B60T 11/224; B60T 13/142; B60T 13/145; B60T 13/146; B60T 13/148; B60T 13/162; B60T 13/58; B60T 13/585; B60T 1/065; B60T 1/16; B60T 2201/03; B60T 2201/04; B60T 2210/12; B60T 2210/13; B60T 2210/32; B60T 2230/03; B60T 2250/03; B60T 2250/04; B60T 2270/602; B60T 2270/608; B60T 7/122; B60T 7/18; B60T 8/00; B60T 8/17; B60T 8/1706; B60T 8/172; B60T 8/1725; B60T 8/173; B60T 8/174; B60T 8/17616; B60T 8/267; B60T 8/3655; B60T 8/368; B60T 8/38; B60T 8/4266; B60T 8/5012; B60T 8/5056; B60T 8/5081; B60T 8/58
See application file for complete search history.

(56) References Cited

FOREIGN PATENT DOCUMENTS

| JP | 2006-137392 A | 6/2006 |
|---|---|---|
| JP | 2006-177442 A | 7/2006 |

* cited by examiner

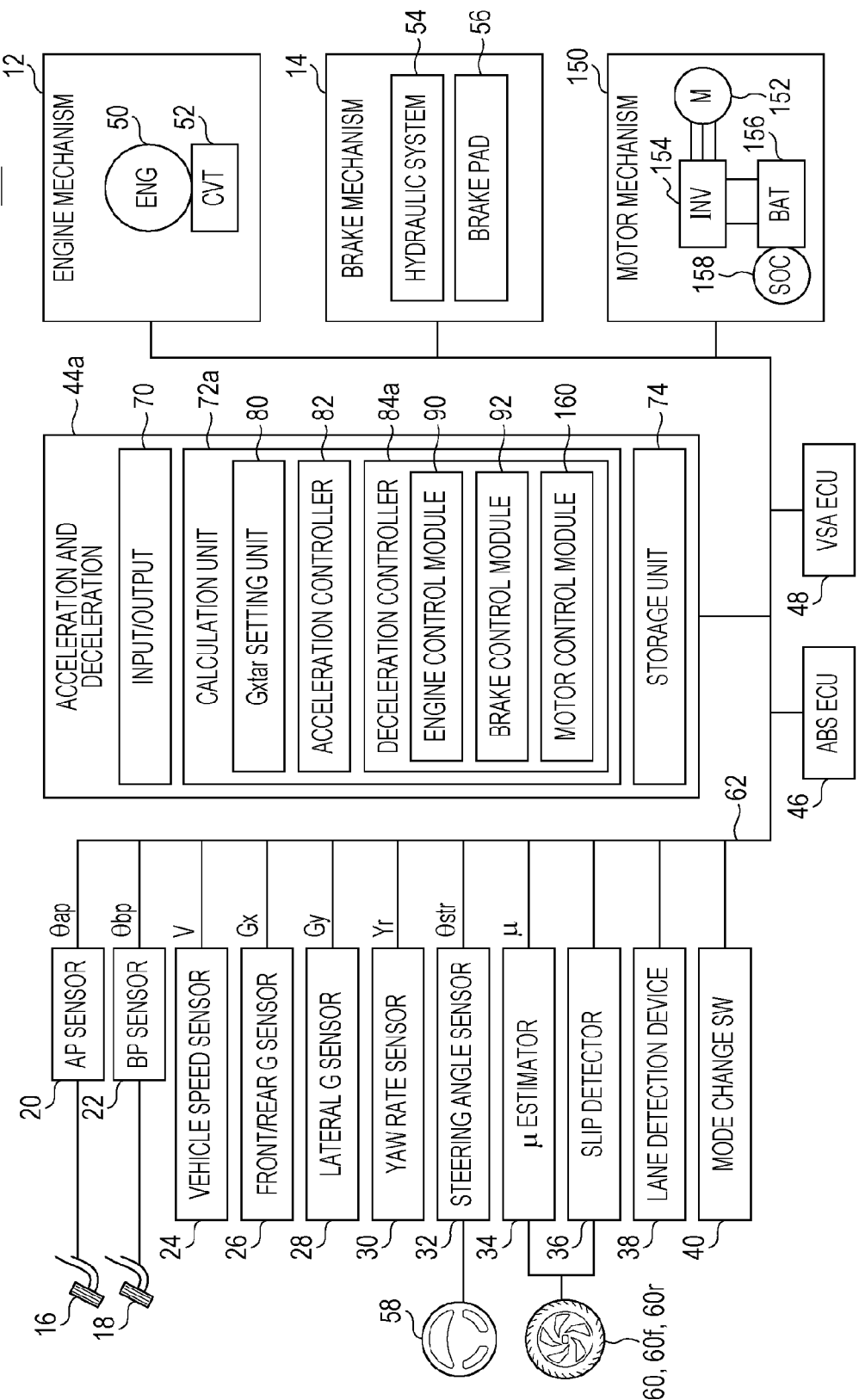

RUNNING CONTROL DEVICE FOR VEHICLES

CROSS REFERENCES TO RELATED APPLICATIONS

The present application claims priority under 35 U.S.C. §119 to Japanese Patent Application No. 2015-029416, filed Feb. 18, 2015, entitled "Running Control Device For Vehicle." The contents of this application are incorporated herein by reference in their entirety.

TECHNICAL FIELD

The present disclosure relates to a running control device for a vehicle that controls acceleration and deceleration of a vehicle according to an amount of operation of one operating pedal.

BACKGROUND

In Japanese Unexamined Patent Application Publication No. 2005-226671 (hereinafter referred to as "JP 2005-226671 A"), when a road surface friction coefficient is less than or equal to a predetermined value (when the road has a low μ), deceleration control is performed according to road situations on the execution condition which is ON state of brake pedal 18. In addition, when the road surface friction coefficient is greater than the predetermined value, the deceleration control is performed on the execution condition which is OFF state of an accelerator pedal (claim 1, ABSTRACT, FIG. 2).

In JP 2005-226671 A, the deceleration control includes down shift control in a transmission, reduction control of an engine output, operation control of a power generator, and braking control by a brake (claim 2, [0074]).

In Japanese Unexamined Patent Application Publication No. 2006-177442 (hereinafter referred to as "JP 2006-177442 A"), there is disclosed an acceleration and deceleration control device 10 which has a deceleration region and an acceleration region formed in an operation stroke of a single pedal and which controls the acceleration and deceleration of a vehicle by controlling a braking force generator, a driving force generator, and a continuously variable transmission according to an operation amount of the pedal (ABSTRACT).

In a braking and driving distributor 26 in JP 2006-177442 A, for instance, only when deceleration greater than achievable by an engine braking region is needed, just a needed portion may be distributed to a target braking output axis torque (in other words, only when deceleration, which is greater than the deceleration achievable in the engine braking region, is requested, the braking force generator may be operated by a brake manager 50 ([0024])). Alternatively, a target output axis torque may be distributed to the target braking output axis torque in such a manner that the number of revolutions of the engine in a fuel cut region is maintained ([0024]).

As described above, in JP 2005-226671 A, the deceleration control according to road situations includes down shift control in a transmission, reduction control of an engine output, operation control of a power generator, and braking control by a brake (claim 2, [0074]). However, in JP 2005-226671 A, no discussion is provided on such control that has a configuration in which acceleration and deceleration of a vehicle is controlled according to an operation amount of one operating pedal. In addition, there is room for improvement in the manner how the transmission, the engine, the power generator, and the brake are combined for use in the deceleration control.

Although JP 2006-177442 A discloses a configuration in which acceleration and deceleration of a vehicle is controlled according to an operation amount of one operating pedal, there is room for improvement in combination of various types of brake.

SUMMARY

The present disclosure has been made in consideration of the above-mentioned problem and one embodiment provides a running control device for vehicles capable of controlling acceleration and deceleration of a vehicle by a single operating pedal and of preferably performing a brake operation corresponding to a deceleration operation of the operating pedal in a configuration that allows an operation of multiple types of brake.

A running control device for vehicles according to one aspect of the present disclosure is mounted on a vehicle and at least a deceleration region and an acceleration region are set in a range of operation amount of one operation element. When the operation amount of the operation element is in the deceleration region, the running control device applies braking to the vehicle by a requested braking force according to the operation amount of the operation element, using at least one of engine braking generated by an internal-combustion engine or a transmission of the vehicle and regenerative braking generated by an electric motor, and friction braking generated by friction due to contact with wheels, and the running control device, when determining that a behavior of the vehicle during running is in a stable state, increases a distribution of the engine braking or the regenerative braking in the entire requested braking force and decreases a distribution of the friction braking, and the running control device, when determining that the behavior of the vehicle during running is in an unstable state or probably assumes an unstable state in near future, decreases the distribution of the engine braking or the regenerative braking in the entire requested braking force and increases the distribution of the friction braking to at least a driven wheel of the wheels.

Accordingly, even with the same operation amount of the operation element, the distribution of at least one of engine braking and regenerative braking, and the distribution of friction braking are changed according to the behavior state of a vehicle. This enables enhancement of the steering stability of the vehicle or sense of stability of the vehicle felt by a driver.

When the behavior of the vehicle is in a stable state, the distribution of engine braking or regenerative braking is increased and the distribution of friction braking is decreased in the entire requested braking force of the vehicle. This enables improvement of fuel efficiency (recovery efficiency of kinetic energy). In addition, use of friction braking is reduced, thereby reducing wear of a brake member and making it possible to protect against brake fade.

Furthermore, when the behavior of the vehicle is in an unstable state or probably assumes an unstable state in the near future, the distribution of engine braking or regenerative braking in the requested braking force of the entire vehicle is decreased and the distribution of friction braking to the driven wheel is increased. Thus the front/rear force (braking force) applied to the drive wheel by engine braking or regenerative braking is reduced, thereby making it possible to stabilize the behavior of the vehicle. In addition, since reduced portion of the distribution of engine braking or regenerative braking is complemented by at least friction braking of the driven wheel, requested braking force requested by a driver via the operation element is easily ensured.

The running control device, when determining that the behavior of the vehicle is in an unstable state or probably assumes an unstable state in near future, may decrease the distribution of the engine braking or the regenerative braking in the entire requested braking force and may increase the distribution of the friction braking to both a drive wheel and the driven wheel, and may adjust the distribution of the friction braking to the drive wheel and the driven wheel based on a front and rear weight distribution of the vehicle.

Thus, the distribution of friction braking to the drive wheel and the driven wheel (in other words, the front wheels and the rear wheels) is adjusted by the front and rear weight distribution of the vehicle in addition to different control between the drive wheel and driven wheel. Consequently, the front/rear force or the lateral force is utilized efficiently in each of the front wheels and the rear wheels, thereby making it possible to further stabilize the behavior of the vehicle.

The front and rear weight distribution of the vehicle mentioned above may be, for instance, the front and rear weight distribution (or simply weight distribution) in the specification of the vehicle. Alternatively, the above-mentioned front and rear weight distribution may be the front and rear weight distribution associated with the acceleration and deceleration of the vehicle or a posture change of the vehicle due to a slope change of a road surface.

The running control device may obtain a behavior state amount of the vehicle from a behavior state amount detection device, the running control device, when determining that the behavior of the vehicle probably assumes an unstable state in near future, may decrease the distribution of the engine braking or the regenerative braking according to the behavior state amount and increases the distribution of the friction braking according to the behavior state amount, and the running control device, when determining that the behavior of the vehicle is in an unstable state, may set the distribution of the engine braking or the regenerative braking to zero and may generate all the requested braking force by friction braking.

In this manner, when the behavior of the vehicle probably assumes an unstable state in the near future, the distribution of braking force can be changed in advance. Therefore, a sense of discomfort to a driver may be reduced, which is due to a change of distribution of braking force in a short time since the behavior of the vehicle actually becomes unstable. When the behavior of the vehicle actually assumes an unstable state, all the requested braking force requested by a driver is generated by friction braking, thereby making it possible to cause the behavior of the vehicle to resume to a stable state promptly.

The running control device may include an operation speed acquisition unit that acquires an operation speed of the operation element, and may increase a rate of shift of the distribution of braking force caused by the engine braking or the regenerative braking to the distribution of braking force caused by the friction braking as the operation speed increases. When the operation speed of the operation element is high, abrupt deceleration may be performed, and accordingly the behavior of the vehicle may be changed abruptly. Thus, it is possible to stabilize the behavior of the vehicle by increasing the rate of shift of the braking force distribution.

The running control device may obtain a turning state amount of the vehicle from a turning state amount detection device, and when the turning state amount indicates that the vehicle has changed from straight running to turning, the running control device may decrease the distribution of the engine braking or the regenerative braking in the requested braking force and may increase the distribution of the friction braking to rear wheels.

Thus, when the vehicle turns, the braking force to the rear wheels is increased at an early stage, thereby making it possible to facilitate turning of the vehicle. For this reason, the distribution of braking force affected by the state of the engine or motor may be achieved in a state in which turning of the vehicle is facilitated and the behavior is easily stabilized. Therefore, variation in the behavior of the vehicle at the time of turning is reduced and the turning behavior of the vehicle has the same response to a turning operation all the time. Consequently, it is possible to improve a sense of comfort to a driver and to reduce a sense of discomfort to the driver.

When slip occurs in one of the wheels, or anti-lock control, which eliminates the slip of the wheels, is in operation by an anti-lock control device, or behavior change control is in operation by a behavior change control device, the behavior change control being configured to change the behavior of the vehicle by applying braking force to the wheels independently or cooperatively to assist turning of the vehicle or to stabilize the behavior of the vehicle, the running control device may determine that the behavior of the vehicle is in an unstable state.

With the above-described configuration, when slip occurs in the wheels or when anti-lock brake control or behavior change control is in operation, interference with another control may be avoided by engine braking or regenerative braking associated with the operation amount of the operation element, and unintended change in behavior of the vehicle may be reduced.

When the requested braking force based on the operation amount of the operation element or a braking force applied to the drive wheel exceeds a generatable braking force limited by a road surface friction coefficient, the running control device may determine that the behavior of the vehicle probably assumes an unstable state in near future. Consequently, in a situation where the wheels easily slip, friction braking is applied preferentially and an occurrence of slip may be avoided. It is to be noted that the braking force applied to the drive wheel is determined by the sum of engine braking, regenerative braking, and friction braking in operation.

In a configuration in which the vehicle is a front wheel drive vehicle, the running control device, when determining that the vehicle is in an understeer state or probably assumes an understeer state during turning, may calculate a maximum gripping force of the rear wheels based on a rear wheel weight and a road surface friction coefficient, may calculate a requested lateral force of the rear wheels based on a steering angle of the vehicle, and may calculate a front/rear force limited value of the rear wheels based on the maximum gripping force and the requested lateral force, and the running control device, when determining that the vehicle is in an understeer state or probably assumes an understeer state during turning, may decrease the distribution of the engine braking or the regenerative braking in the entire requested braking force and may increase the distribution of the friction braking to the rear wheels in a range not exceeding the front/rear force limited value of the rear wheels.

When a front wheel drive vehicle has assumed an understeer state during turning, one factor for the understeer state is probably that the braking force to the front wheels is greater than needed. With the above-described configuration, when it is determined that the vehicle is in an understeer state or probably assumes an understeer state during turning, the distribution of engine braking or regenerative braking is decreased and the distribution of friction braking to the rear wheels is increased. Consequently, the braking force to the front wheels serving as the drive wheels is decreased and the decreased portion is complemented by the braking force to the rear wheels, caused by friction braking, and the gripping force of the front wheels is thereby recovered and the understeer state can be eliminated.

Also, the distribution of friction braking to the rear wheels is limited to a range not exceeding the front/rear force limited value of the rear wheels, and thus it is possible to stabilize the behavior of the vehicle.

In a configuration in which the vehicle is a front wheel drive vehicle, the running control device, when determining that the vehicle is in an oversteer state or probably assumes an oversteer state during turning, may calculate a maximum gripping force of the front wheels based on a front wheel weight and a road surface friction coefficient, may calculate a requested lateral force of the front wheels based on a steering angle of the vehicle, and may calculate a front/rear force limited value of the front wheels based on the maximum gripping force and the requested lateral force, and the running control device, when determining that the vehicle is in an oversteer state or probably assumes an oversteer state during turning, may decrease the distribution of the friction braking to the rear wheels in the entire requested braking force and may increase the distribution of the engine braking or the regenerative braking in a range not exceeding the front/rear force limited value of the front wheels.

When a front wheel drive vehicle has assumed an oversteer state during turning, one factor for the oversteer state is probably that the braking force to the rear wheels is greater than needed. With the above-described configuration, when it is determined that the vehicle is in an oversteer state or probably assumes an oversteer state during turning, the distribution of friction braking to the rear wheels is decreased and the distribution of engine braking or regenerative braking is increased. Consequently, the braking force to the rear wheels serving as the driven wheels is decreased and the decreased portion is complemented by the braking force to the front wheels, and the gripping force of the rear wheels is thereby recovered and the oversteer state can be eliminated.

Also, the distribution of engine braking or regenerative braking to the front wheels is limited to a range not exceeding the front/rear force limited value of the front wheels, and thus it is possible to stabilize the behavior of the vehicle.

According to one embodiment of the present disclosure, it is possible to control acceleration and deceleration of a vehicle by a single operating pedal and to preferably perform a brake operation corresponding to a deceleration operation of the operating pedal in a configuration that allows an operation of multiple types of brake.

BRIEF DESCRIPTION OF THE DRAWINGS

The advantages of the disclosure will become apparent in the following description taken in conjunction with the following drawings.

FIG. 11 is a block diagram of a vehicle equipped with an acceleration and deceleration electronic control unit which serves as a running control device for vehicles according to a second embodiment of the present disclosure.

DETAILED DESCRIPTION

A. First Embodiment

A1. Configuration of Vehicle 10

Figure 1:
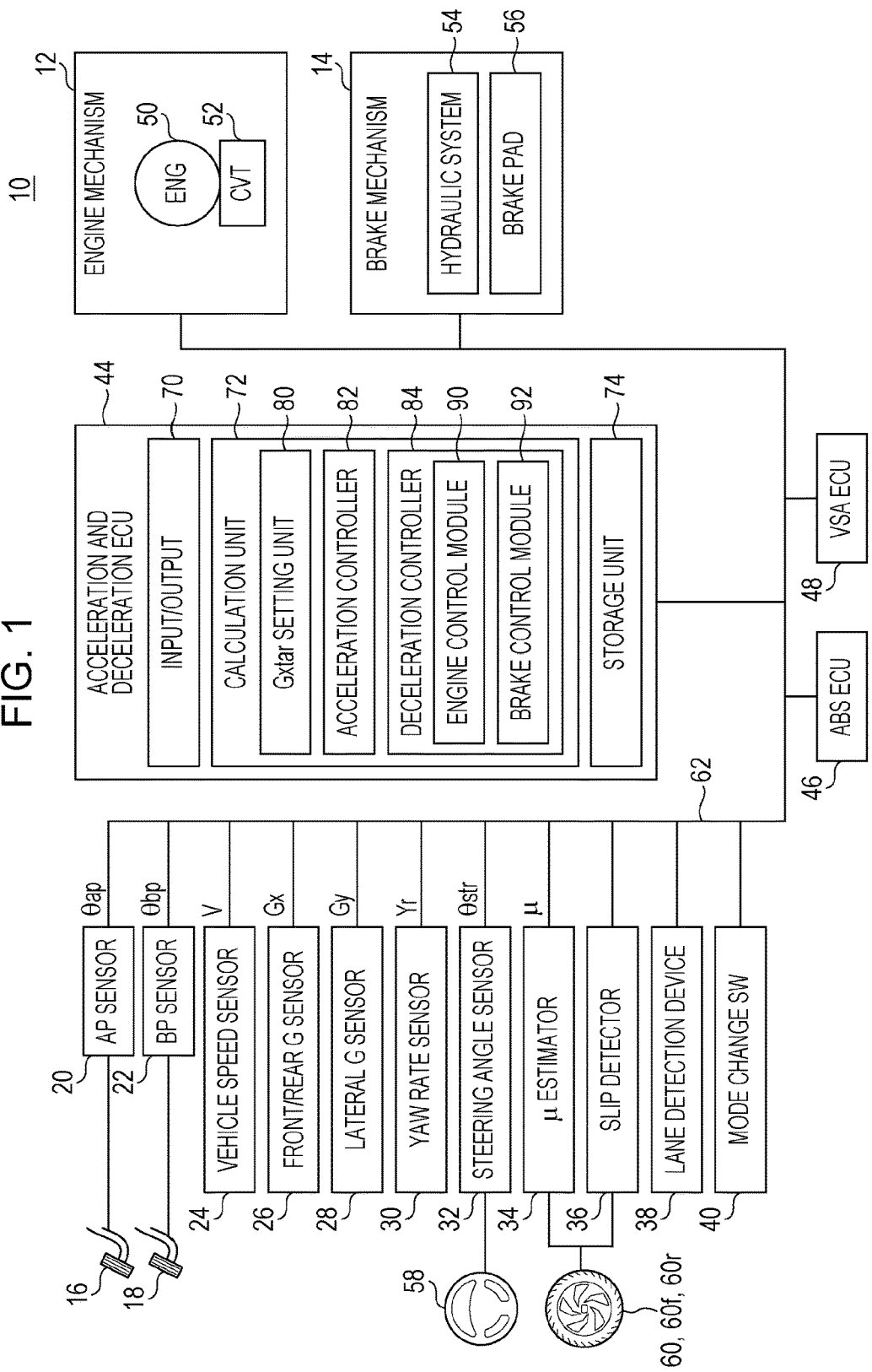
FIG. 1 is a block diagram of a vehicle equipped with an acceleration and deceleration electronic control unit which serves as a running control device for vehicles according to a first embodiment of the present disclosure.

FIG. 1 is a block diagram of a vehicle 10 equipped with an acceleration and deceleration electronic control unit 44 (hereinafter referred to as an "acceleration and deceleration electronic control unit 44" or "ECU 44") which serves as a running control device for vehicles according to a first embodiment of the present disclosure. The vehicle 10 in the first embodiment is a vehicle with a front wheel drive (FWD) engine.

In addition to the acceleration and deceleration ECU 44, the vehicle 10 includes an engine mechanism 12, a brake mechanism 14, an accelerator pedal 16, a brake pedal 18, an accelerator pedal sensor 20 (hereinafter referred to as an "AP sensor 20"), a brake pedal sensor 22 (hereinafter referred to as a "BP sensor 22"), a vehicle speed sensor 24, a front/rear acceleration sensor 26 (hereinafter referred to as a "front/rear G sensor 26"), a lateral acceleration sensor 28 (hereinafter referred to as a "lateral G sensor 28"), a yaw rate sensor 30, a steering angle sensor 32, a friction coefficient estimator 34 (hereinafter referred to as a "μ estimator 34"), a slip detector 36, a lane detection device 38, a mode change switch 40, an anti-lock brake system electronic control unit 46 (hereinafter referred to as an "ABS ECU 46" or "ECU 46"), and a vehicle stability assist electronic control unit 48 (hereinafter referred to as a "VSA ECU 48" or "ECU 48").

It is to be noted that although FIG. 1 illustrates that the components are connected to the same communication line 62 to form a communication system (such as a LAN), the components may belong to a plurality of communication systems.

In addition to this, similarly to, for instance, Japanese Unexamined Patent Application Publication No. 2006-117020 (hereinafter referred to as "JP 2006-117020 A"), an actuator (such as a motor) for reaction force generation (not illustrated) may be provided to apply a reaction force to the accelerator pedal 16, and a driver may be informed of the boundary between the later-described deceleration region and acceleration region (see FIG. 3 to FIG. 7 of JP 2006-117020 A).

The engine mechanism 12 includes an engine 50 and a transmission 52. The engine 50 is a drive source of the vehicle 10 and is controlled by the ECU 44. Although the transmission 52 in the present embodiment is a continuously variable transmission (CVT), the transmission 52 may be another type of transmission. Hereinafter, the transmission 52 may also be referred to as CVT 52. Engine braking may be applied by at least one of the engine 50 and the CVT 52.

The brake mechanism 14 includes components such as a hydraulic system 54 and a brake pad 56, and comes into contact with wheels 60 to apply a frictional braking force Ffr to the wheel 60. Friction braking may be applied by the brake mechanism 14. Hereinafter, the front wheels of the wheels 60 may be referred to as front wheels 60f and the rear wheels of the wheels 60 may also be referred to as rear wheels 60r. In addition, frictional braking force Ffr applied to the front wheels 60f is referred to as front wheel frictional braking force Ffrf or frictional braking force Ffrf, and frictional braking force Ffr applied to the rear wheels 60r is referred to as rear wheel frictional braking force Ffrr or frictional braking force Ffrr.

In the hydraulic system 54 in the first embodiment, what is called X piping is used for hydraulic connection. In the X piping, the left front wheel and the right rear wheel are connected by hydraulic piping, and the left rear wheel and the right front wheel are connected by another hydraulic piping. Alternatively, what is called front/rear piping may be used for hydraulic connection in the hydraulic system 54. In the front/rear piping, the left front wheel and the right front wheel are connected by hydraulic piping, and the left rear wheel and the right rear wheel are connected by another hydraulic piping.

The AP sensor 20 detects an amount of depression (hereinafter referred to as an "operation amount θap" or "AP operation amount θap") [deg] of the accelerator pedal 16 from the original position of the accelerator pedal 16. A value (operation amount θap) detected by the AP sensor 20 is outputted to the acceleration and deceleration ECU 44 and others via the communication line 62 (the outputs of other sensors are similarly processed). The BP sensor 22 detects an amount of depression (hereinafter referred to as an "operation amount θbp" or "BP operation amount θbp") [deg] of the brake pedal 18 from the original position of the brake pedal 18. The vehicle speed sensor 24 detects a vehicle speed V [km/h] of the vehicle 10.

The front/rear G sensor 26 detects an acceleration (hereinafter referred to as a "front/rear acceleration Gx" or "acceleration or deceleration Gx") [m/s/s] of the vehicle 10 in a front/rear direction. The lateral G sensor 28 detects an acceleration (hereinafter referred to as a "lateral acceleration Gy") [m/s/s] of the vehicle 10 in a lateral direction (vehicle width direction). The yaw rate sensor 30 detects a yaw rate Yr [deg/s] of the vehicle 10.

The steering angle sensor 32 detects a steering angle θstr (hereinafter referred to as a "steering angle θstr") [deg] of steering 58. The μ estimator 34 estimates a road surface friction coefficient t. Estimate of the road surface coefficient of friction μ is made, for instance, based on the amount of movement of the vehicle 10 when the frictional braking force Ffr is momentarily applied to the wheels 60 from the brake mechanism 14 during running of the vehicle 10.

The slip detector 36 detects an occurrence of slip of the wheels 60. For the detection of slip, it is determined that slip occurs in a wheel 60 with a wheel speed having a deviation which is relative to an estimated vehicle body speed and greater than a predetermined wheel speed difference, the estimated vehicle body speed being calculated based on, for instance, the wheel speed of each of the wheels 60, the front/rear acceleration Gx, the lateral acceleration Gy, and the driving force or the braking force of the vehicle 10. Alternatively, determination of slip may be made based on the amount of movement of the vehicle 10 when the frictional braking force Ffr is applied to the wheels 60 from the brake mechanism 14 in response to an operation of the brake pedal 18 or automatic braking during running of the vehicle 10.

The lane detection device 38 detects white lines on the right and left on the roadway of the vehicle 10. The lane detection device 38 includes, for instance, a forward camera, and an image processor that processes an image obtained by the forward camera to extract white lines.

The mode change switch 40 is a switch for changing an operation mode (hereinafter referred to as an "AP operation mode") using the accelerator pedal 16, and is disposed, for instance, on the steering wheel (not illustrated) or its periphery. The AP operation mode includes normal mode and one pedal mode.

The one pedal mode is a mode that controls the acceleration and deceleration of the vehicle 10 according to AP operation amount θap (an operation amount of an operation element). For instance, 20 to 40% of attainable range of the AP operation amount θap is used for deceleration. A region of AP operation amount θap for acceleration (hereinafter referred to as an "acceleration region") and a region of AP operation amount θap for deceleration (hereinafter referred to as a "deceleration region") may be changed according to the vehicle speed V.

The normal mode is a mode that controls the acceleration of the vehicle 10 according to AP operation amount θap, and substantially all the region except for the original position of the accelerator pedal 16 and its surrounding area is basically used for acceleration of the vehicle 10. However, in this mode, engine braking functions in the normal mode.

The acceleration and deceleration ECU 44 controls the engine mechanism 12 and the brake mechanism 14 based on input information such as operation amounts θap, θbp, thereby controlling the acceleration and deceleration of the vehicle 10. The acceleration and deceleration ECU 44 includes an input/output 70, a calculation unit 72, and a storage unit 74.

The calculation unit 72 controls the acceleration and deceleration of the vehicle 10, and includes target acceleration and deceleration setting unit 80 (hereinafter also referred to as a "Gxtar setting unit 80"), an acceleration controller 82, and a deceleration controller 84. The Gxtar setting unit 80 sets a target value of acceleration or deceleration G of the vehicle 10 (hereinafter referred to as a "target acceleration or deceleration Gxtar") based on input information such as operation amounts θap, θbp.

In the first embodiment, a positive value of the target acceleration or deceleration Gxtar indicates acceleration of the vehicle 10, and a negative value of the target acceleration or deceleration Gxtar indicates deceleration of the vehicle 10. For the sake of easy understanding, acceleration or deceleration Gx and target acceleration or deceleration Gxtar each with a negative value are also referred to as deceleration D and target deceleration Dtar, respectively.

The acceleration controller 82 controls the acceleration of the vehicle 10 based on the target acceleration or deceleration Gxtar set by the Gxtar setting unit 80. The deceleration controller 84 controls the deceleration of the vehicle 10 based on the target acceleration or deceleration Gxtar (target deceleration Dtar) set by the Gxtar setting unit 80. The deceleration controller 84 includes an engine control module 90 and a brake control module 92.

The engine control module 90 controls the engine mechanism 12 (the engine 50 and the CVT 52) based on the target deceleration Dtar. The brake control module 92 controls the brake mechanism 14 based on the BP operation amount θbp or the target deceleration Dtar.

The storage unit 74 has a non-volatile memory and a volatile memory which are not illustrated. The non-volatile memory is, for instance, a flash memory or an electrically erasable programmable read only memory (EEPROM) in which programs for executing the processing in the calculation unit 72 are stored. The volatile memory is, for instance, a dynamic random access memory (DRAM) and is used when the calculation unit 72 executes processing.

The ABS ECU 46 executes anti-lock brake control which prevents the wheels 60 from locking when frictional braking force Ffr is applied to the wheels 60 from the brake mechanism 14 (when braking operation is performed). The VSA ECU 48 (behavior change control device) executes turn behavior stabilization control that stabilizes the behavior of the vehicle 10 when the vehicle 10 turns (including turning on a curve, changing a lane). Similarly to the acceleration and deceleration ECU 44, the ECU 46, 48 each include an input/output, a calculation unit, and a storage unit.

A2. Setting of Target Acceleration or Deceleration Gxtar in One Pedal Mode (A2-1. Basic Acceleration and Deceleration Characteristics)

Figure 2:
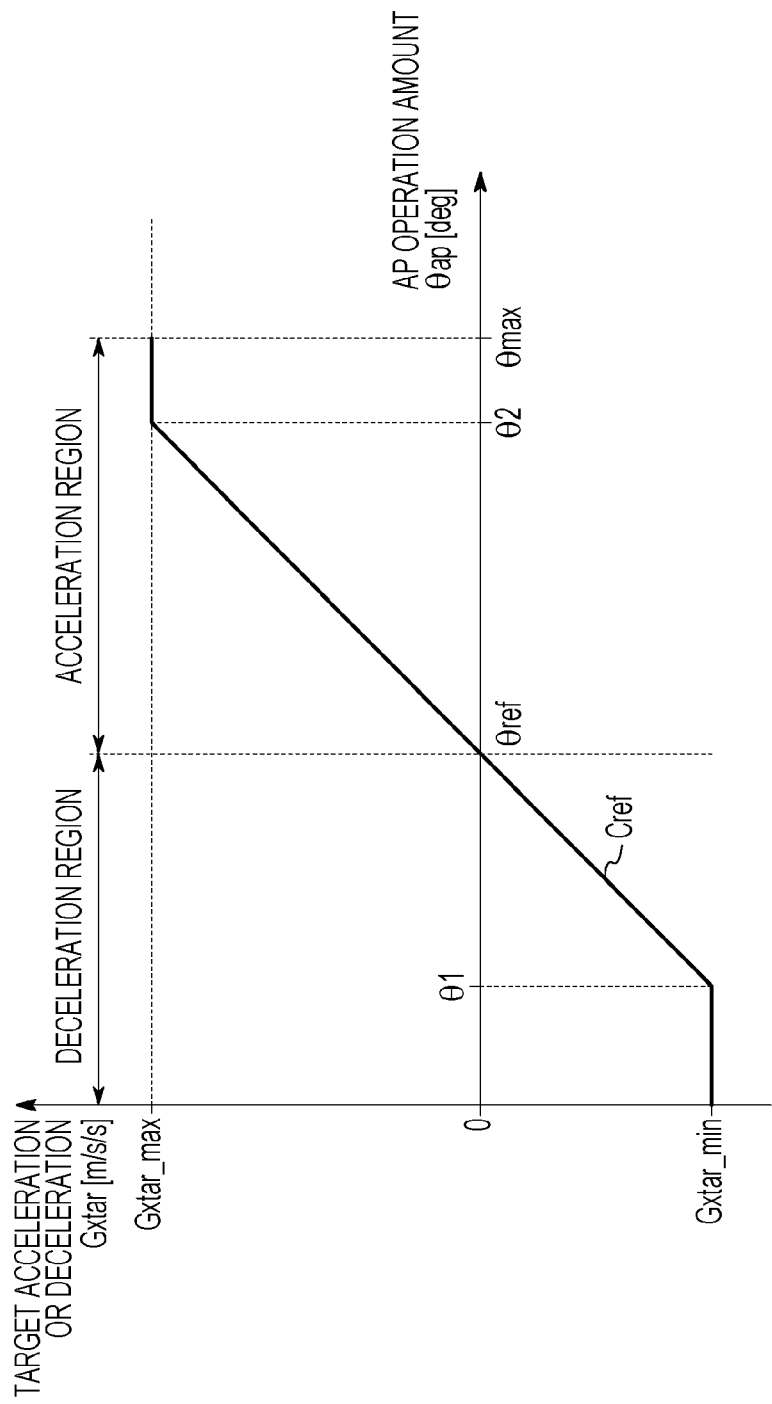
FIG. 2 is a graph illustrating an example of basic acceleration and deceleration characteristic used in one pedal mode in the first embodiment.

FIG. 2 is a graph illustrating an example of basic acceleration and deceleration characteristic (reference characteristic Cref) used in one pedal mode in the first embodiment. In FIG. 2, the horizontal axis indicates the AP operation amount θap, and the vertical axis indicates the target acceleration or deceleration Gxtar. The reference characteristic Cref is changed according to the vehicle speed V.

As described above, one pedal mode is a mode that controls the acceleration and deceleration of the vehicle 10 according to the AP operation amount θap (operation amount of an operation element). As illustrated in FIG. 2, a deceleration region and an acceleration region are provided in relation to the AP operation amount θap. The deceleration region corresponds to a relatively small AP operation amount θap (0≤θap<θref), and the acceleration region corresponds to a relatively large AP operation amount θap (θref<θap≤θmax). Hereinafter, the threshold value between the deceleration region and the acceleration region is also referred to as a boundary threshold value θref or a threshold value θref. A maximum value attainable by the AP operation amount θap is referred to as a maximum operation amount θmax.

In the range greater than threshold value θ1 and less than threshold value θref out of the deceleration region, the ECU 44 controls at least one of the engine 50, the CVT 52, and the brake mechanism 14 so that the absolute value of the deceleration D (acceleration or deceleration Gx) of the vehicle 10 increases as the AP operation amount θap decreases. In the range θ1 or greater and θ1 or less out of the deceleration region, the ECU 44 controls the engine 50 so that the target acceleration or deceleration Gxtar of the vehicle 10 (the target deceleration Dtar) is nearly constant at a minimum target acceleration or deceleration Gxtar_min (=maximum deceleration).

In the range greater than boundary threshold value θref and less than threshold value θ2 out of the acceleration region, the ECU 44 controls the engine mechanism 12 so that the acceleration of the vehicle 10 (acceleration or deceleration Gx) increases as the AP operation amount θap increases. In the range threshold value θ2 or greater and maximum operation amount θmax or less out of the acceleration region, the ECU 44 controls the engine mechanism 12 so that the target acceleration or deceleration Gxtar of the vehicle 10 is nearly constant at a maximum target acceleration or deceleration Gxtar_max.

It is to be noted although only the deceleration region and the acceleration region are illustrated in the example of FIG. 2, other regions may also be provided as described later.

(A2-2. Overall Flow)

Figure 3:
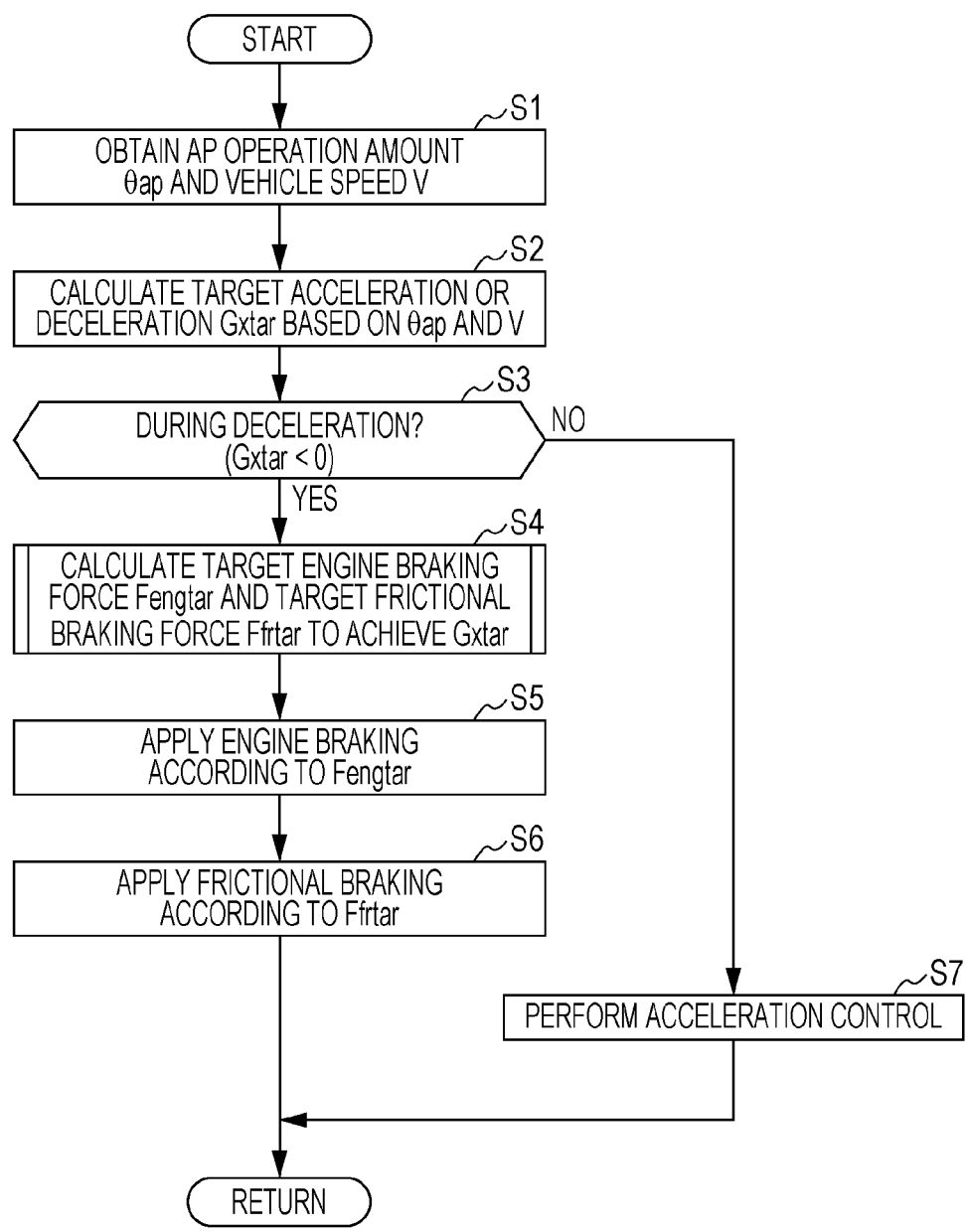
FIG. 3 is a flow chart illustrating acceleration processing and deceleration processing in the one pedal mode in the first embodiment.

FIG. 3 is a flow chart illustrating acceleration processing and deceleration processing in one pedal mode in the first embodiment. It is to be noted that only the accelerator pedal 16 is operated and the brake pedal 18 is not operated in FIG. 3. In FIG. 3, step S1, S2 are performed by the Gxtar setting unit 80, step S3 is performed by the acceleration controller 82 and the deceleration controller 84, step S4 to S6 are performed by the deceleration controller 84, and step S7 is performed by the acceleration controller 82.

In step S1, the acceleration and deceleration ECU 44 obtains AP operation amount θap from the AP sensor 20, and a vehicle speed V from the vehicle speed sensor 24. In step S2, the ECU 44 calculates a target acceleration or deceleration Gxtar based on the AP operation amount θap and the vehicle speed V.

In step S3, the ECU 44 determines whether or not the vehicle 10 is in deceleration. Specifically, the ECU 44 determines whether or not the target acceleration or deceleration Gxtar has a negative value. When the vehicle 10 is in deceleration (YES in S3), the flow proceeds to step S4.

In step S4, the ECU 44 calculates target acceleration or deceleration Gxtar (target deceleration Dtar) in order to achieve target engine braking force Fengtar and target frictional braking force Ffrtar. The target engine braking force Fengtar is a target value of a braking force (engine braking force Feng) to be generated by the engine 50 and/or the CVT 52. The target frictional braking force Ffrtar is a target value of a braking force (frictional braking force Ffr) to be generated by the brake mechanism 14.

In step S5, the ECU 44 applies engine braking (engine mechanism 12) based on the target engine braking force Fengtar. In step S6, the ECU 44 applies friction braking (brake mechanism 14) based on the target frictional braking force Ffrtar.

Returning to step S3, when the vehicle 10 is not in deceleration (NO in S3), in step S7, the ECU 44 performs acceleration control to accelerate the vehicle 10.

(A2-3. Calculation of Target Engine Braking Force Fengtar and Target Frictional Braking Force Ffrtar)

(A2-3-1. Overall Flow)

Figure 4:
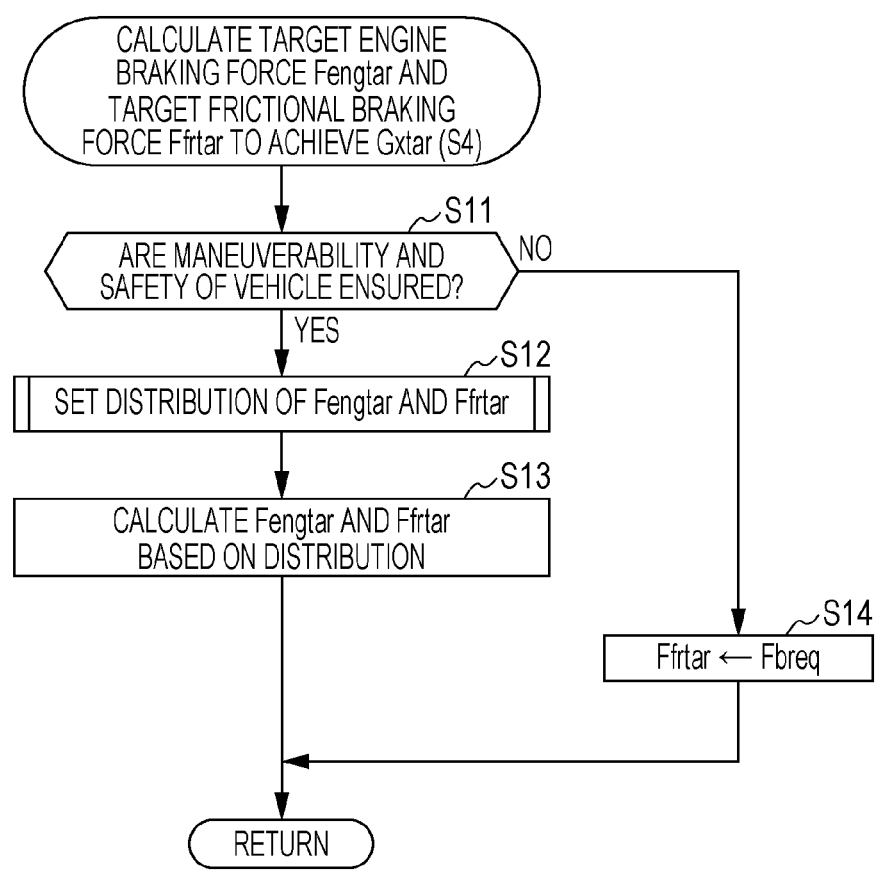
FIG. 4 is a flow chart (the detail of S4 in FIG. 3) to calculate a target engine braking force and a target frictional braking force in the first embodiment.

FIG. 4 is a flow chart (the detail of S4 in FIG. 3) to calculate target engine braking force Fengtar and target frictional braking force Ffrtar in the first embodiment. It is to be noted that similarly to FIG. 3, in FIG. 4, only the accelerator pedal 16 is operated and the brake pedal 18 is not operated (that is, control logic is separately provided for deceleration using an operation of the brake pedal 18).

In step S11 of FIG. 4, the ECU 44 determines whether or not maneuverability and stability of the vehicle 10 are ensured. The determination is made based on the following criteria, for instance (other examples will be described later).

(a1) Whether or not notification of operation of components such as the engine mechanism 12, the brake mechanism 14 for maneuverability/stability control is received from electronic control units (such as ABS ECU 46, VSA ECU 48) other than the acceleration and deceleration ECU 44, which perform control (maneuverability/stability control) for ensuring the maneuverability and stability of the vehicle 10.

(a2) Whether or not slip has occurred in one of the wheels 60.

For instance, when notification, which indicates that slip in the wheels 60 is being eliminated by anti-lock brake control (anti-lock brake control is in operation), is received from the ABS ECU 46, the acceleration and deceleration ECU 44 determines that the maneuverability or stability of the vehicle 10 has not been ensured. Also, when notification, which indicates that frictional braking force Ffr is being generated in one of the wheels 60 to change the behavior of the vehicle 10 by turn behavior stabilization control (turn behavior stabilization control is in operation), is received from the VSA ECU 48, the acceleration and deceleration ECU 44 determines that the maneuverability or stability of the vehicle 10 has not been ensured.

When the maneuverability and stability of the vehicle 10 are ensured (YES in S11), in step S12, the ECU 44 sets the distribution of braking force between target engine braking force Fengtar and target frictional braking force Ffrtar related to requested braking force Fbreq. In step S12, the ECU 44 calculates target engine braking force Fengtar and target frictional braking force Ffrtar to use engine braking effectively while ensuring the maneuverability and stability of the vehicle 10.

In step S13, the ECU 44 calculates target engine braking force Fengtar and target frictional braking force Ffrtar according to the distribution set in step S12.

Returning to step S11, when the maneuverability or stability of the vehicle 10 is not ensured (NO in S11), in step S14, the ECU 44 sets the target frictional braking force Ffrtar to be equal to the requested braking force Fbreq. Thus, only the friction braking is applied and the engine braking is not applied.

It is to be noted that in step S14, when the engine braking is applied, a limitation may be provided for the time differential value of the amount of change in target engine braking force Fengtar and target frictional braking force Ffrtar.

Also, the distribution of target frictional braking force Ffrtar between the front wheels 60f and the rear wheels 60r may be associated with the front and rear weight distribution of the vehicle 10, for instance. The front and rear weight distribution of the vehicle 10 mentioned above may be, for instance, the front and rear weight distribution (or simply weight distribution) in the specification of the vehicle 10. Alternatively, the above-mentioned front and rear weight distribution may be the front and rear weight distribution associated with the acceleration and deceleration of the vehicle 10 or a posture change of the vehicle 10 due to a slope change of a road surface. For instance, when the vehicle 10 is in deceleration, a higher weight is distributed to the front wheels compared with the front and rear weight distribution in the specification of the vehicle 10.

Optionally, the distribution may be such that the utmost use is made of the lateral force Fy of the front wheels 60f and the rear wheels 60r. For instance, the ECU 44 calculates a friction circle 100 (FIG. 6) for each wheel 60, and calculates lateral force Fy of each wheel 60 in the range of the friction circle 100.

(A2-3-2. Setting Distribution (S12 in FIG. 4) of Target Engine Braking Force Fengtar and Target Frictional Braking Force Ffrtar)

Figure 5:
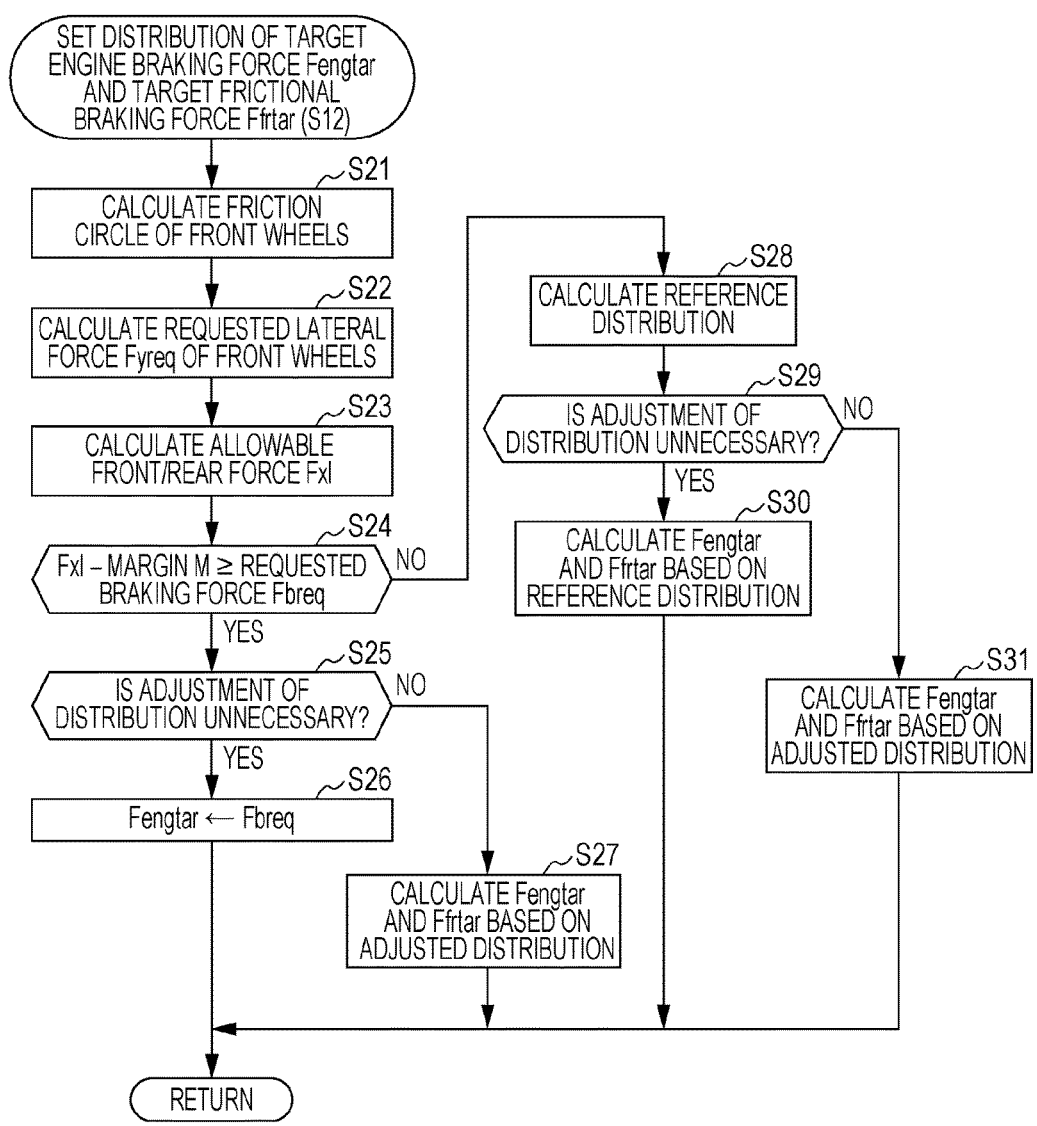
FIG. 5 is a flow chart (the detail of S12 in FIG. 4) to set distribution between the target engine braking force and the target frictional braking force in the first embodiment.

FIG. 5 is a flow chart (the detail of S12 in FIG. 4) to set distribution between target engine braking force Fengtar and target frictional braking force Ffrtar in the first embodiment.

In step S21, the ECU 44 calculates friction circles 100 of both front wheels 60f based on road surface friction coefficient μ and contact weights Wfl, Wfr of the front wheels 60f.

Figure 6:
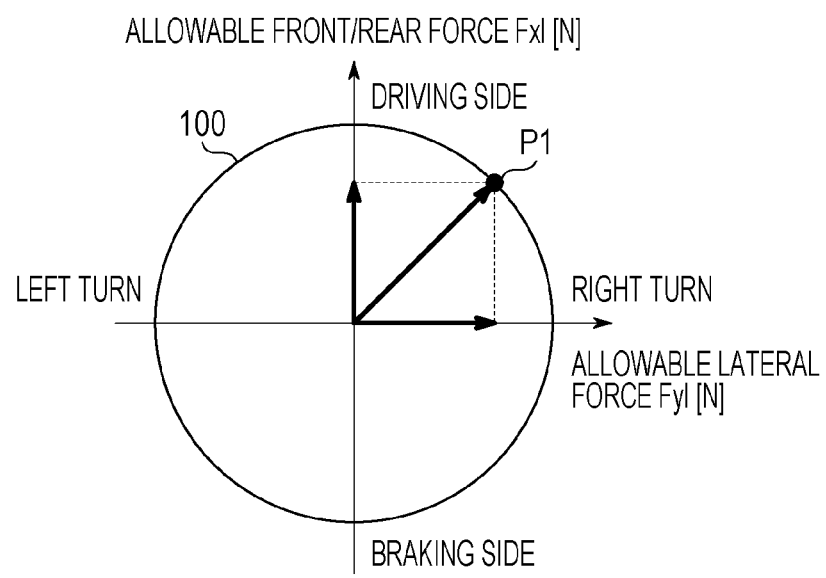
FIG. 6 is a diagram illustrating an example of a friction circle in the first embodiment.

FIG. 6 is a diagram illustrating an example of friction circle 100 in the first embodiment. In FIG. 6, the horizontal axis indicates allowable lateral force Fyl, and the vertical axis indicates allowable front/rear force Fxl. The allowable lateral force Fyl is a maximum value of the lateral force which may be generated by a wheel 60. The allowable front/rear force Fxl is a maximum value of the front/rear force which may be generated by the wheel 60.

The radius of the friction circle 100 indicates a maximum gripping force of the wheel 60. The size of each friction circle 100 has approximately a direct proportional relationship with the road surface friction coefficient μ and a corresponding one of contact weights Wfl, Wfr, Wrl, Wrr of the wheels 60 (the left front wheel, the right front wheel, the left rear wheel, the right rear wheel). Therefore, the size of each friction circle 100 may be set based on the road surface friction coefficient μ and one of the contact weights Wfl, Wfr, Wrl, Wrr of the wheels 60.

It is to be noted that the contact weights Wfl, Wfr, Wrl, Wrr here may be the values in the specification of the vehicle 10, or alternatively, may be values associated with the posture change of the vehicle 10 due to running. When the contact weights Wfl, Wfr, Wrl, Wrr are set in association with the posture change of the vehicle 10 due to running, the ECU 44 may calculate the contact weights based on one or more of the vehicle speed V, the front/rear acceleration Gx, the lateral acceleration Gy, the steering angle θstr, the position of the seat of an occupant, and displacement of a damper, for instance.

When any point (for instance, point P1) on the friction circle 100 is set, allowable lateral force Fyl and allowable front/rear force Fxl corresponding to the point are determined. In other words, when allowable lateral force Fyl is set in a specific friction circle 100, allowable front/rear force Fxl corresponding to the allowable lateral force Fyl is determined.

Figure 7:
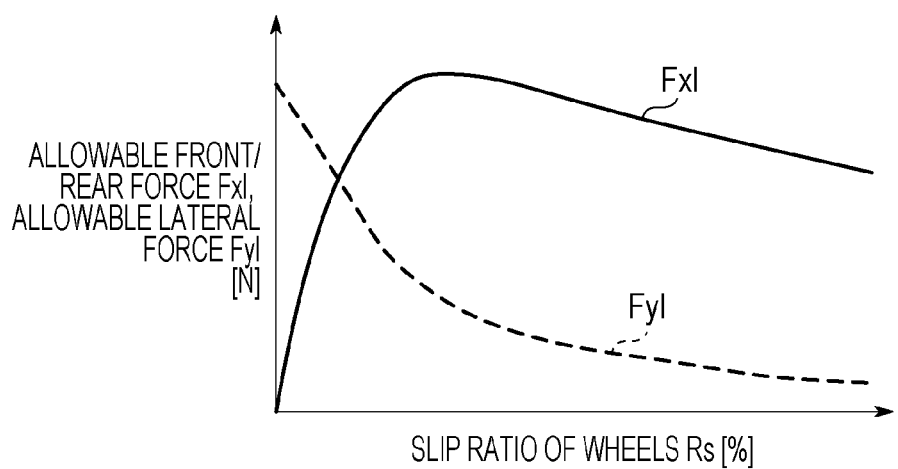
FIG. 7 is a graph illustrating an example of relationship between a slip ratio of a wheel, an allowable front/rear force, and an allowable lateral force in the first embodiment.

FIG. 7 is a graph illustrating an example of relationship between slip ratio Rs of each wheel 60, allowable front/rear force Fxl, and allowable lateral force Fyl of the wheel 60 in the first embodiment. The slip ratio Rs is expressed by the following Expression (1).

$$Rs = \{(V - Vw)/Vw\} \times 100 \quad (1)$$

In Expression (1), V is a vehicle speed (vehicle body speed) and Vw is a wheel speed.

As illustrated in FIG. 7, when the slip ratio Rs of the wheel 60 increases, the allowable lateral force Fyl of the wheel 60 decreases significantly. For this reason, the friction circle 100 reduces in size as the slip ratio Rs increases.

Returning to FIG. 5, in step S22, the acceleration and deceleration ECU 44 calculates requested lateral force Fyreq for both front wheels 60f based on, for instance, the vehicle speed V and the steering angle θstr. The requested lateral force Fyreq is a lateral force needed for both front wheels 60f according to a running state of the vehicle 10. The requested lateral force Fyreq may be adjusted according to the AP operation amount θap, the lateral acceleration Gy, the yaw rate Yr, and other factors.

In step S23, the ECU 44 calculates allowable front/rear force Fxl of each front wheel 60f, corresponding to the requested lateral force Fyreq (see FIG. 6). That is, when requested lateral force Fyreq (allowable lateral force Fyl in FIG. 6) is determined in the friction circle 100 of each front wheel 60f, allowable front/rear force Fxl is determined. It is to be noted that the allowable front/rear force Fxl calculated in step S23 is the sum of the allowable front/rear force Fxl of the left front wheel 60f and the allowable front/rear force Fxl of the right front wheel 60f in order to use the sum in step S24.

In step S24, the ECU 44 determines whether or not the difference between the allowable front/rear force Fxl of the front wheels 60f and margin M is greater than or equal to the requested braking force Fbreq. The requested braking force Fbreq is the braking force [F] corresponding to the target acceleration or deceleration Gxtar [m/s/s], and is calculated based on the target acceleration or deceleration Gxtar, the weight of the vehicle 10, and other factors. The margin M is used to facilitate the application of friction braking in advance in consideration of a change in running state of the vehicle 10. For instance, when the allowable front/rear force Fxl of the front wheels 60f is used as it is, the front wheels 60f may slip due to slight change in the situation. Thus, use of the margin M may reduce the possibility of slipping. In the case where calculation by the acceleration and deceleration ECU 44 is performed at tremendously high speed, the margin M may not be set.

When the difference between the allowable front/rear force Fxl and the margin M is greater than or equal to the requested braking force Fbreq (YES in S24), in step S25, the ECU 44 determines whether or not it is unnecessary to adjust the distribution between the target engine braking force Fengtar and the target frictional braking force Ffrtar. Necessity of the adjustment will be described later with reference to FIG. 9.

When adjustment of the distribution is unnecessary (YES in S25), in step S26, the ECU 44 sets the target engine braking force Fengtar to be equal to the requested braking force Fbreq. Thus, the ECU 44 allows only the engine braking to be applied and prohibits the friction braking from being applied.

When adjustment of the distribution is necessary (NO in S25), in step S27, the ECU 44 adjusts the distribution and calculates the target engine braking force Fengtar and the target frictional braking force Ffrtar based on the adjusted distribution. The detail of step S27 (and step S29, S31 described later) is also described later with reference to FIG. 9.

Returning to step S24, when the difference between the allowable front/rear force Fxl and the margin M is not greater than or equal to the requested braking force Fbreq (NO in S24), in step S28, the ECU calculates a reference distribution between the target engine braking force Fengtar and the target frictional braking force Ffrtar related to the requested braking force Fbreq (the detail is described later with reference to FIG. 8).

In step S29, the ECU 44 determines whether or not it is unnecessary to adjust the distribution between the target engine braking force Fengtar and the target frictional braking force Ffrtar. The determination is the same as that in step S25.

When adjustment of the distribution is unnecessary (YES in S29), in step S30, the ECU 44 calculates the target engine braking force Fengtar and the target frictional braking force Ffrtar based on the reference distribution calculated in step S28.

When adjustment of the distribution is necessary (NO in S29), in step S31, the ECU 44 adjusts the distribution and calculates the target engine braking force Fengtar and the target frictional braking force Ffrtar based on the adjusted distribution.

(A2-3-3. Calculation of Reference Distribution (S28 in FIG. 5))

Figure 8:
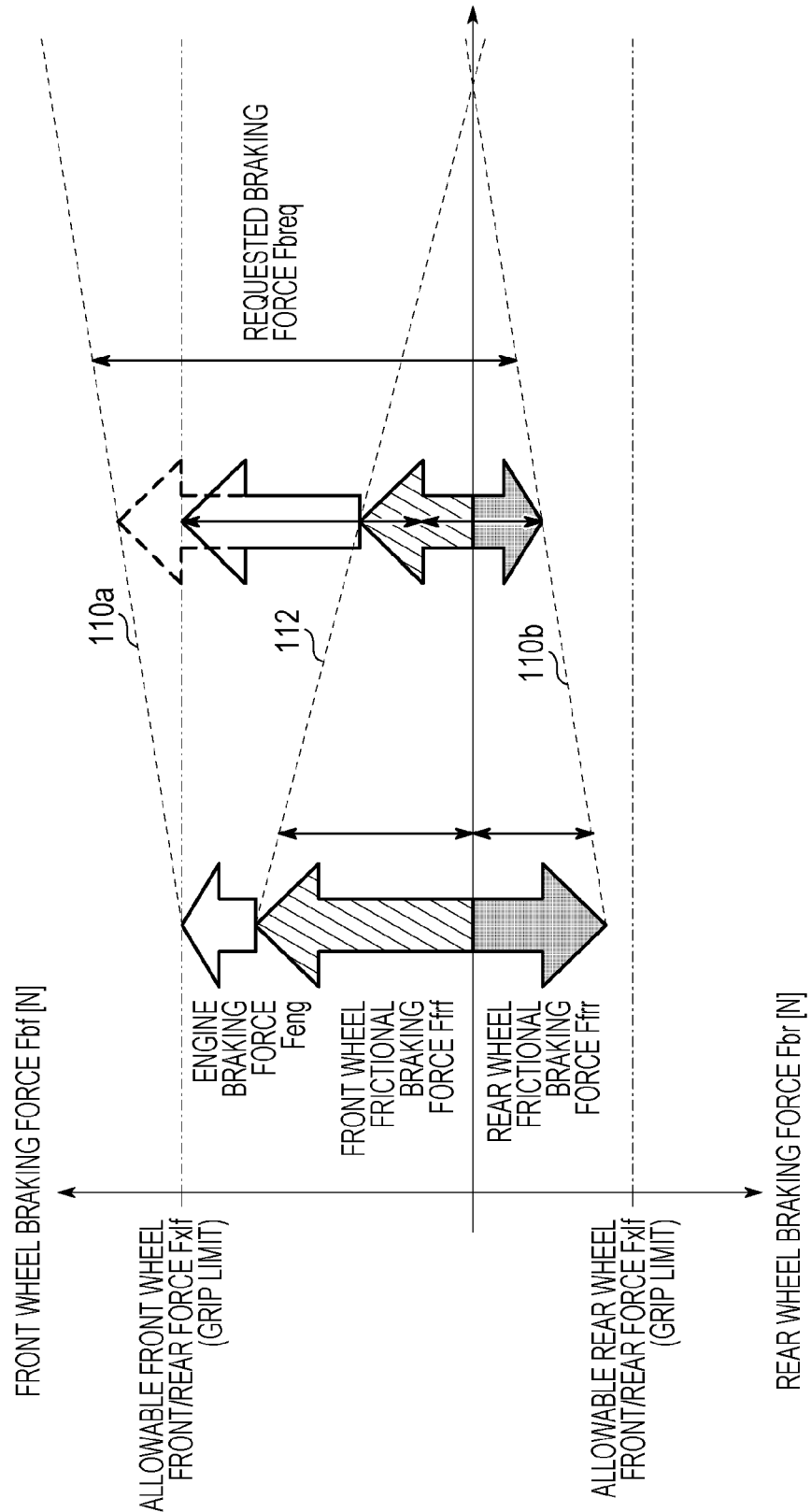
FIG. 8 is a chart for explaining reference distribution between an engine braking force and a frictional braking force in the first embodiment.

FIG. 8 is a chart for explaining reference distribution between the engine braking force Feng and the frictional braking force Ffr in the first embodiment. In FIG. 8, the vertical axis indicates the braking force Fbf applied to the front wheels 60f and the braking force Fbr applied to the rear wheels 60r. The horizontal axis indicates two examples in which the engine braking force Feng and the frictional braking forces Ffrf, Ffrr are different.

In addition, FIG. 8 illustrates allowable front/rear force Fxlf which is the allowable front/rear force Fxl (grip limit) of the front wheels 60f, and allowable front/rear force Fxlr which is the allowable front/rear force Fxl of the rear wheels 60r. Furthermore, FIG. 8 illustrates sloped lines 110a, 110b which indicate the size of requested braking force Fbreq.

When the braking force Fbf applied to the front wheels 60f exceeds the allowable front/rear force Fxlf, the front wheels 60f will slip. Similarly, when the braking force Fbr applied to the rear wheels 60r exceeds the allowable front/rear force Fxlr, the rear wheels 60r will slip. Thus, the acceleration and deceleration ECU 44 have to set the target engine braking force Fengtar and the target frictional braking force Ffrtar (the target front wheel frictional braking force Ffrftar and the target rear wheel frictional braking force Ffrrtar) so that the braking forces Fbf, Fbr do not exceed allowable front/rear forces Fxlf, Fxlr (grip limit).

As described with reference to FIG. 5, in the first embodiment, when the difference between the allowable front/rear force Fxl (the sum of the allowable front/rear forces Fxlf of the left front wheel and the right front wheel) of the front wheels 60f and the margin M is greater than or equal to the requested braking force Fbreq (YES in S24) and adjustment of the distribution is unnecessary (YES in S25), the target engine braking force Fengtar is set to be equal to the requested braking force Fbreq (S26). In other words, when the requested braking force Fbreq is satisfied, the engine braking force Feng is utilized as much as possible.

Also, when the requested braking force Fbreq is not satisfied by the allowable front/rear force Fxlf of the front wheels 60f, the requested braking force Fbreq is complemented by the frictional braking force Ffr of the rear wheels 60r. In this case, the relationship between the requested braking force Fbreq, the target engine braking force Fengtar, and the target frictional braking force Ffrtar can be expressed by the following Expression (2).

$$Fbreq = Fengtar + Ffrtar \qquad (2)$$

Also, the target frictional braking force Ffrtar is the sum of the target front wheel frictional braking force Ffrftar and the target rear wheel frictional braking force Ffrrtar, and is expressed by the following Expression (3).

$$Ffrtar = Ffrftar + Ffrrtar \qquad (3)$$

In order to make the most use of the engine braking force Feng, the target rear wheel frictional braking force Ffrrtar is preferably close to the difference between the requested braking force Fbreq and the allowable front/rear force Fxlf of the front wheels 60f. Therefore, the target rear wheel frictional braking force Ffrrtar can be expressed, for instance, by the following Expression (4).

$$Ffrrtar = Fbreq - Fxlf \qquad (4)$$

Here, in the hydraulic system 54 of the braking mechanism 14 in the first embodiment, X piping is used as described above. Thus, the ratio (hereinafter referred to as "ratio α") of the frictional braking forces Ffrf of the front wheels 60f to the frictional braking force Ffrr of the rear wheels 60r is fixed. Therefore, the braking forces Fb simultaneously occur in the left front wheel 60f and the right rear wheel 60r with the fixed ratio α. Similarly, the braking forces Fb simultaneously occur in the right front wheel 60f and the left rear wheel 60r with the fixed ratio α. Consequently, the braking forces Fb simultaneously occur in the left and right front wheels 60f and the right and left rear wheels 60r with the fixed ratio α.

The sloped line 110b in FIG. 8 in a combination with sloped line 112 illustrates the manner in which the frictional braking forces Ffrf, Ffrr change with the fixed ratio α.

Since the frictional braking forces Ffrf, Ffrr simultaneously occur in the left and right front wheels 60f and the right and left rear wheels 60r with the fixed ratio α in this manner, the relationship in the following Expression (5) is established between the target frictional braking force Ffrftar of the front wheels 60f and the target frictional braking force Ffrrtar of the rear wheels 60r.

$$Ffrftar = \alpha \times Ffrrtar \qquad (5)$$

The following Expression (6) is derived from the above Expression (4) and Expression (5).

$$Ffrftar = \alpha(Fbreq - Fxlf) \qquad (6)$$

The following Expression (7) is derived from Expression (2) to Expression (6).

$$Fengtar = (1+\alpha)Fxlf - \alpha \cdot Fbreq \qquad (7)$$

As described above, the ratio α is a fixed value and the variables of the right hand side of Expression (7) are the allowable front/rear force Fxlf of the front wheels 60f and the requested braking force Fbreq. Also, the allowable front/rear force Fxlf is set based on the requested lateral force Fyreq (S23 in FIG. 5). Thus, when the allowable lateral force Fyl and the requested braking force Fbreq are set, it is possible to calculate the target engine braking force Fengtar, the target front wheel frictional braking force Ffrftar, and the target rear wheel frictional braking force Ffrrtar.

(A2-3-4. Adjustment of Distribution of Target Braking Force Fengtar, Ffrtar (S25, S27, S29, S31 in FIG. 5))

(A2-3-4-1. Summary of Adjustment of Distribution)

In the first embodiment, distribution between the target engine braking force Fengtar and the target frictional braking force Ffrtar is corrected as describes below. Thus, the determination of whether or not the adjustments in step S25, S29 in FIG. 5 are unnecessary determines whether or not the adjustments are necessary. In other words, in FIG. 5, after the necessity of adjustment of the distribution is checked in step S25, S29, the distribution between the target engine braking force Fengtar and the target frictional braking force Ffrtar is adjusted. On the other hand, it is to be noted that FIG. 9 described below illustrates the determination of the necessity of adjustment of the distribution (S25, S29) and adjustment after the determination (S27, S31) in a combined form.

Figure 9:
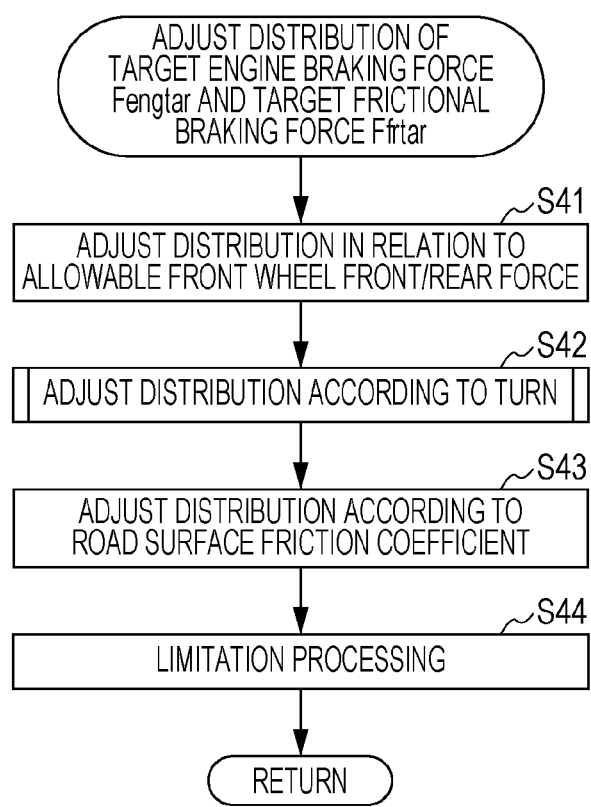
FIG. 9 is a flow chart related to distribution adjustment of the target engine braking force and the target frictional braking force in the first embodiment.

FIG. 9 is a flow chart related to distribution adjustment of the target engine braking force Fengtar and the target frictional braking force Ffrtar in the first embodiment. As described above, the flow chart of FIG. 9 corresponds to S25, S27, S29, S31 in FIG. 5.

In step S41, the acceleration and deceleration ECU 44 adjusts the distribution in relation to the allowable front/rear force Fxlf of the front wheels 60f (or the margin M). In step S42, the ECU 44 adjusts the distribution according to turn of the vehicle 10. In step S43, the ECU 44 adjusts the distribution according to the road surface friction coefficient μ. In step S44, the ECU 44 performs limitation processing related to the distribution.

(A2-3-4-2. Adjustment of Distribution in Relation to Allowable Front/Rear Force Fxlf of Front Wheels 60f (Margin M) (S41 in FIG. 9))

As described above, when the allowable front/rear force Fxlf of the front wheels 60f is utilized as it is, the front wheels 60f may slip due to a slight change of situation. Thus, in the first embodiment, the margin M is used, thereby setting a maximum of the target engine braking force Fengtar to a value smaller than the allowable front/rear force Fxlf of the front wheels 60f. Although the margin M here has the same value as that used in step S24 of FIG. 5, a different value may be used.

In the case where the possibility of reduction in the maneuverability or stability of the vehicle 10 is not low due to the use of the margin M, the target engine braking force Fengtar is set to be slightly lower and the target frictional braking force Ffrtar is increased.

The case where the possibility of reduction in the maneuverability or stability of the vehicle 10 is not low includes the case where the front/rear force Fx of a wheel 60 is close to or exceeds the allowable front/rear force Fxl (a maximum of gripping force in a front/rear direction) of the wheel 60 in a straight running state or turning state.

In the case of the straight running state, the lateral force Fy of the wheel 60 is essentially unnecessary. Therefore, the allowable front/rear force Fxl may be set to a value equal to or slightly smaller than the radius (size) of the friction circle 100. In the case of the turning state, the requested lateral force Fyreq varies with the specification and an amount of turning (for instance, the lateral acceleration Gy, the yaw rate Yr, and the vehicle speed V) of the vehicle 10. The allowable front/rear force Fxl is then calculated according to the requested lateral force Fyreq (see FIG. 6).

(A2-3-4-3. Distribution Adjustment According to Turning (S42 in FIG. 9))

Figure 10:
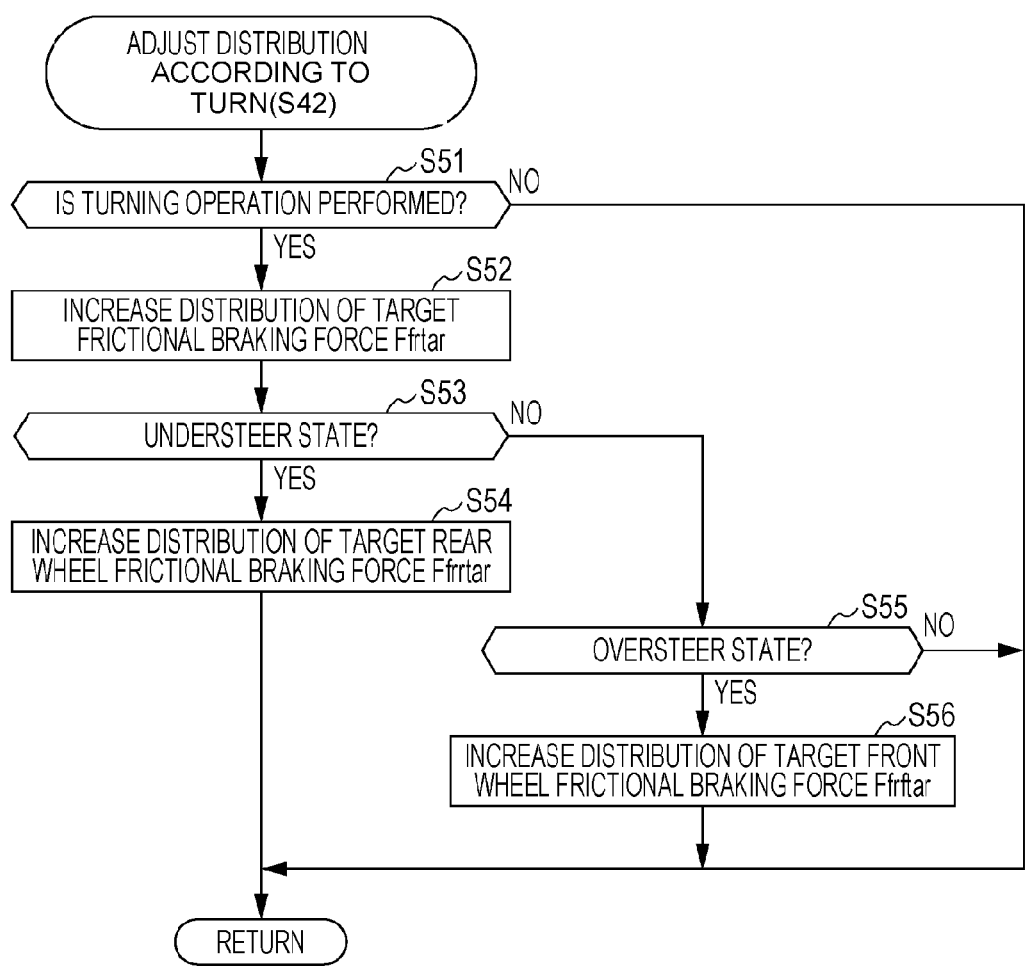
FIG. 10 is a flow chart (the detail of S42 in FIG. 9) related to distribution adjustment of the target engine braking force and the target frictional braking force according to turning of the vehicle in the first embodiment.

FIG. 10 is a flow chart (the detail of S42 in FIG. 9) related to distribution adjustment of the target engine braking force Fengtar and the target frictional braking force Ffrtar according to turning of the vehicle 10 in the first embodiment. In step S51, the acceleration and deceleration ECU 44 determines whether or not a turning operation has been performed by a driver. The determination may be made by determining, for instance, whether or not the steering angle θstr exceeds a threshold value (steering angle threshold value THθstr).

When a turning operation is performed (YES in S51), the flow proceeds to step S52, and when a turning operation is not performed (in other words, the vehicle 10 continues to run straight) (NO in S51), the current processing is terminated.

It is to be noted that the determination in step S51 may identify only a turn start time such as a start of turning the steering 58. This allows a shift to a distribution of the braking force Fb in which the vehicle 10 easily turns.

Alternatively, the determination in step S51 may determine whether or not the vehicle 10 is during turning. In addition to or in replacement of the steering angle θstr, the determination may determine whether or not one or more of the lateral acceleration Gy and the yaw rate Yr exceeds a threshold value.

In step S52, the ECU 44 increases the distribution of the target frictional braking force Ffrtar and decreases the distribution of the target engine braking force Fengtar. This enables prevention of disturbance of behavior due to unbalanced distribution of the braking force Fb between the front wheels 60f and the rear wheels 60r.

In step S52, the ECU 44 may increase the distribution of the target rear wheel frictional braking force Ffrrtar and may decrease the distribution of the target front wheel frictional braking force Ffrftar relative to a reference state. Thus, it is possible to achieve a behavior that facilitates turning of the vehicle 10 on a curve or the like. The reference state herein refers to a distribution according to the front and rear weight distribution, for instance.

In step S53, the ECU 44 determines whether or not vehicle 10 is in an understeer state. In the determination, it is possible to determine an understeer state when the difference between the vehicle body target yaw rate (absolute value) pre-set by, for instance, the steering angle θstr, the lateral acceleration Gy, and the vehicle body speed (vehicle speed V), and actually generated yaw rate Yr (absolute value) is greater than or equal to a predetermined value (positive threshold value).

It is to be noted that even when the steering angle θstr formed by an operation of a driver does not reach a value necessary for the vehicle to turn on a curve, as long as a turn according to the steering angle θstr is made, comparison between the vehicle body target yaw rate and the actually generated yaw rate Yr does not result in the determination of an understeer state. However, when a turning state with insufficient steering angle θstr continues, the vehicle 10 will run out of the outer lane. The driver turns the steering 58 more to avoid running out of the lane, which often results in an abrupt steering operation and the possibility of occurring an oversteer state increases.

Then, in step S53, it is also possible to determine not only the case where an understeer state has actually occurred but also the case where an understeer state probably occurs. For instance, for a detection unit to check the possibility of occurrence of an understeer state, it is possible to determine that an understeer state probably occurs based on a state in which the vehicle 10 is closer to an outer lane detected by the lane detection device 38.

When the vehicle 10 is in an understeer state (YES in S53), in step S54, the ECU 44 increases the distribution of the target rear wheel frictional braking force Ffrrtar and decreases the distribution of the target front wheel frictional braking force Ffrftar. In the above step, the target rear wheel frictional braking force Ffrrtar is increased so as not to exceed the allowable front/rear force Fxl.

When the vehicle 10 is not in an understeer state (NO in S53), in step S55, the ECU 44 determines whether or not the vehicle 10 is in an oversteer state. In the determination, it is possible to determine an oversteer state when the difference between the vehicle body target yaw rate (absolute value) pre-set by, for instance, the steering angle θstr, the lateral acceleration Gy, and the vehicle body speed (vehicle speed V), and actually generated yaw rate Yr (absolute value) is less than or equal to a predetermined value (negative threshold value).

It is to be noted that, in step S55, it is also possible to determine not only the case where an oversteer state has actually occurred but also the case where an oversteer state probably occurs. For instance, in the case where a driver performs a sudden turning operation or a sudden turning back operation for lane change at the entrance of a corner, actually generated yaw rate Yr becomes closer to the vehicle body target yaw rate with a steep slope. In such a case, before the determination of an oversteer state is made, it is possible to determine that an oversteer state probably occurs.

When the vehicle 10 is in an oversteer state (YES in S55), in step S56, the ECU 44 increases the distribution of the target front wheel frictional braking force Ffrftar and decreases the distribution of the target rear wheel frictional braking force Ffrrtar. In the above step, the target front wheel frictional braking force Ffrftar is increased so as not to exceed the allowable front/rear force Fxl.

It is to be noted that the understeer state in step S53 and/or the oversteer state in step S55 may include what is called a reversesteer state.

(A2-3-4-4. Distribution Adjustment According to Road Surface Friction Coefficient μ, (S43 in FIG. 9))

When the vehicle 10 is running on a slippery road (in other words, when the road surface friction coefficient μ exceeds friction coefficient threshold value THμ), the acceleration and deceleration ECU 44 increases the distribution of the target frictional braking force Ffrtar and decreases the distribution of the target engine braking force Fengtar. In addition, the ECU 44 makes an adjustment so that distribution between the target front wheel frictional braking force Ffrftar and the target rear wheel frictional braking force Ffrrtar is closer to the front and rear weight distribution of the vehicle 10. The front and rear weight distribution of the vehicle 10 mentioned above may be, for instance, the front and rear weight distribution (or simply weight distribution) in the specification of the vehicle 10. Alternatively, the above-mentioned front and rear weight distribution of the vehicle 10 may be the front and rear weight distribution associated with the acceleration and deceleration of the vehicle 10 or a posture change of the vehicle 10 due to a slope change of a road surface.

(A2-3-4-5. Limitation Processing (S44 in FIG. 9))

In the case where the distribution between the target frictional braking force Ffrtar and the target engine braking force Fengtar is changed quickly in spite of non-emergency situation, the behavior of the vehicle 10 may be disturbed. Thus, in the first embodiment, limitation processing is performed in which change of distribution is limited. In the limitation processing, a limitation is provided for the time differential value of the amount of change in the distribution between the target frictional braking force Ffrtar and the target engine braking force Fengtar. This allows gradual change in the front/rear distribution ratio of the braking force Fb.

It is to be noted that the acceleration and deceleration ECU 44 may increase the rate of shift of the distribution of the braking force Fb caused by engine braking to the distribution of the braking force Fb caused by friction braking as an operation speed (hereinafter also referred to as an "AP operation speed") of the AP operation amount θap increases. When the operation speed is high, abrupt deceleration may be performed, and accordingly the behavior of the vehicle 10 may be changed abruptly. Thus, it is possible to stabilize the behavior of the vehicle 10 by increasing the rate of shift of the braking force distribution.

A3. Effect of First Embodiment

As described above, according to the first embodiment, the acceleration and deceleration ECU 44 (running control device), when determining that the behavior of the vehicle 10 during running is in a stable state (YES in S11 in FIG. 4, YES in S25, YES in S29 in FIG. 5) increases the distribution of engine braking in the entire requested braking force Fbreq, according to the AP operation amount θap (operation amount of an operation element) and decreases the distribution of friction braking (S12 in FIG. 4, S26, S30 in FIG. 5). Also, when it is determined that the behavior of the vehicle 10 during running is in an unstable state or probably assumes an unstable state in the near future (NO in S11 in FIG. 4, NO in S25, NO in S29 in FIG. 5), the acceleration and deceleration ECU 44 decreases the distribution of engine braking in the entire requested braking force Fbreq, according to the AP operation amount θap, and increases the distribution of friction braking to at least the rear wheels 60r (driven wheels) of the wheels 60 (S14 in FIG. 4, S27, S31 in FIG. 5).

According to the first embodiment, even with the same AP operation amount θap, the distribution of engine braking and the distribution of friction braking are changed according to a behavior state of the vehicle 10. This enables enhancement of the steering stability of the vehicle 10 or sense of stability of the vehicle 10 felt by a driver.

When the behavior of the vehicle 10 is in a stable state, out of the requested braking force Fbreq of the entire vehicle 10, the distribution of engine braking is increased and the distribution of friction braking is decreased. This enables improvement of fuel efficiency (recovery efficiency of kinetic energy). In addition, use of friction braking is reduced, thereby reducing wear of the brake pad 56 (brake member) and making it possible to protect against brake fade.

Furthermore, when the behavior of the vehicle 10 is in an unstable state or probably assumes an unstable state in the near future, the acceleration and deceleration ECU 44 decreases the distribution of engine braking in the requested braking force Fbreq of the entire vehicle 10, and increases the distribution of friction braking to the rear wheels 60r (driven wheels). Thus the front/rear force Fx applied to the front wheels 60f (drive wheels) by engine braking is reduced, thereby making it possible to stabilize the behavior of the vehicle 10. In addition, since reduced portion of the distribution of engine braking is complemented by at least friction braking of the rear wheels 60r, requested braking force Fbreq requested by a driver via the accelerator pedal 16 is easily ensured.

In the first embodiment, the acceleration and deceleration ECU 44 (running control device), when determining that the behavior of the vehicle 10 is in an unstable state or probably assumes an unstable state in the near future (NO in S11 in FIG. 4, NO in S25, NO in S29 in FIG. 5), decreases the distribution of engine braking in the entire requested braking force Fbreq. In addition, the ECU 44 increases the distribution of friction braking to both front wheels 60f (drive wheels) and rear wheels 60r (driven wheels) (S14 in FIG. 4, S27, S31 in FIG. 5). Furthermore, the ECU 44 adjusts the distribution of friction braking to the front wheels 60f and the rear wheels 60r based on the front and rear weight distribution of the vehicle 10.

Thus, the distribution of friction braking to the front wheels 60f and the rear wheels 60r is adjusted by the front and rear weight distribution of the vehicle 10 in addition to one of the drive wheels or driven wheels. Consequently, the front/rear force Fx or the lateral force Fy is utilized efficiently in each of the front wheels 60f and the rear wheels 60r, thereby making it possible to further stabilize the behavior of the vehicle 10.

In the first embodiment, the acceleration and deceleration ECU 44 (running control device) obtains detection values (behavior state amount) from the sensors 20, 22, 24, 26, 28, 30, 32, the μ estimator 34, the slip detector 36, and the lane detection device 38 (FIG. 1). The ECU 44, when determining that the behavior of the vehicle 10 probably assumes an unstable state in the near future (NO in S25, NO in S29 in FIG. 5), decreases the distribution of engine braking according to these detection values. In addition, the ECU 44 increases the distribution of friction braking according to the detection values (S27, S31 in FIG. 5, FIG. 9, FIG. 10). The ECU 44, when determining that the behavior of the vehicle 10 is in an unstable state (NO in S11 in FIG. 4), sets the distribution of engine braking to zero and generates all the requested braking force Fbreq according to the AP operation amount θap by friction braking (S14).

In this manner, when the behavior of the vehicle 10 probably assumes an unstable state in the near future, the distribution of braking force Fb can be changed in advance. Therefore, a sense of discomfort to a driver may be reduced, which is due to a change of distribution of braking force Fb in a short time since the behavior of the vehicle 10 actually becomes unstable.

When the behavior of the vehicle 10 actually assumes an unstable state, all the requested braking force Fbreq requested by a driver is generated by friction braking, thereby making it possible to cause the behavior of the vehicle 10 to resume to a stable state promptly.

In the first embodiment, the acceleration and deceleration ECU 44 (running control device) obtains the steering angle θstr, the lateral acceleration Gy, and the yaw rate Yr (turning state amount) from the steering angle sensor 32, the lateral G sensor 28, and the yaw rate sensor 30 (turning state amount detection device) (FIG. 1). When the steering angle θstr, the lateral acceleration Gy, or the yaw rate Yr indicates that the vehicle 10 has changed from straight running to turning (YES in S51 in FIG. 10), the ECU 44 decreases the distribution of engine braking in the requested braking force Fbreq and increases the distribution of friction braking to the rear wheels 60r (S52).

Thus, when the vehicle 10 turns, the braking force Fb to the rear wheels 60r is increased at an early stage, thereby making it possible to facilitate turning of the vehicle 10. For this reason, the distribution of braking force Fb affected by the state of the engine 50 may be achieved in a state in which turning of the vehicle 10 is facilitated and the behavior is easily stabilized. Therefore, variation in the behavior of the vehicle 10 at the time of turning is reduced and the turning behavior of the vehicle 10 has the same response to a turning operation all the time. Consequently, it is possible to improve a sense of comfort to a driver and to reduce a sense of discomfort to the driver.

In the case where slip occurs in one of the wheels 60 in the first embodiment, when anti-lock control is in operation by ABS ECU 46 (anti-lock control device) or turn behavior stabilization control is in operation by the VSA ECU 48 (NO in S11 in FIG. 4), the acceleration and deceleration ECU 44

(running control device) determines that the behavior of the vehicle 10 is in an unstable state.

Thus, when slip occurs in the wheels 60 or when anti-lock brake control or turn behavior stabilization control is in operation, interference with another control may be avoided by engine braking associated with the AP operation amount θap, and unintended change in behavior of the vehicle 10 may be reduced.

In the first embodiment, when the requested braking force Fbreq exceeds the allowable front/rear force Fxl (generatable braking force) limited by the road surface friction coefficient μ (NO in S24 in FIG. 5), the acceleration and deceleration ECU 44 decreases the distribution of engine braking and increases the distribution of friction braking (S28 to S31). In other words, when the braking force Fb applied to the front wheels 60f exceeds the size of the friction circle 100, it is determined that the behavior of the vehicle 10 probably assumes an unstable state in the near future. Consequently, in a situation where the wheels 60 easily slip, friction braking is applied preferentially and an occurrence of slip may be avoided.

In the first embodiment, the vehicle 10 is a front wheel drive vehicle. The acceleration and deceleration ECU 44 (running control device), when determining that the vehicle is in an understeer state or probably assumes an understeer state during turning (YES in S53 in FIG. 10), calculates the size (a maximum tire gripping force) of the friction circle 100 of the rear wheels 60r based on the weight and road surface friction coefficient μ of the rear wheels 60r. The ECU 44 then calculates requested lateral force Fyreq of the rear wheels 60r based on the steering angle θstr. The ECU 44 calculates allowable front/rear force Fxl (front/rear force limited value) of the rear wheels 60r based on the friction circle 100 and the requested lateral force Fyreq of the rear wheels 60r. The ECU 44, when determining that the vehicle 10 is in an understeer state or probably assumes an understeer state during turning, decreases the distribution of engine braking in the entire requested braking force Fbreq according to the AP operation amount θap. In addition, the ECU 44 increases the distribution of friction braking to the rear wheels 60r in a range not exceeding the allowable front/rear force Fxl of the rear wheels 60r (S54 in FIG. 10).

When a front wheel drive vehicle has assumed an understeer state during turning, one factor for the understeer state is probably that the braking force Fb to the front wheels 60f is greater than needed. According to the first embodiment, when it is determined that the vehicle 10 is in an understeer state during turning (YES in S53 in FIG. 10), the distribution of engine braking is decreased and the distribution of friction braking to the rear wheels 60r is increased (S54). Consequently, the braking force Fb to the front wheels 60f serving as the drive wheels is decreased and the decreased portion is complemented by the braking force Fb to the rear wheels 60r, caused by friction braking, and the gripping force of the front wheels 60f is thereby recovered and the understeer state can be eliminated.

Also, the distribution of friction braking to the rear wheels 60r is limited to a range not exceeding the allowable front/rear force Fxl of the rear wheels 60r, and thus it is possible to stabilize the behavior of the vehicle 10.

In the first embodiment, the acceleration and deceleration ECU 44 (running control device), when determining that the vehicle 10 is in an oversteer state or probably assumes an oversteer state during turning (YES in S55 in FIG. 10), calculates the size (a maximum tire gripping force) of the friction circle 100 of the front wheels 60f based on the weight and road surface friction coefficient μ of the front wheels 60f. The ECU 44 calculates requested lateral force Fyreq of the front wheels 60f based on the steering angle θstr. The ECU 44 calculates allowable front/rear force Fxl (front/rear force limited value) of the front wheels 60f based on the friction circle 100 and the requested lateral force Fyreq of the front wheels 60f. The ECU 44, when determining that the vehicle 10 is in an oversteer state or probably assumes an oversteer state during turning (YES in S55 in FIG. 10), decreases the distribution of friction braking to the rear wheels 60r in the entire requested braking force Fbreq. In addition, the ECU 44 increases the distribution of engine braking in a range not exceeding the allowable front/rear force Fxl of the front wheels 60f (S56).

When a front wheel drive vehicle has assumed an oversteer state during turning, one factor for the oversteer state is probably that the braking force Fb to the rear wheels 60r is greater than needed. According to the first embodiment, the ECU 44, when determining that the vehicle 10 is in an oversteer state during turning (YES in S55 in FIG. 10), decreases the distribution of friction braking to the rear wheels 60r and increases the distribution of engine braking (S56). Consequently, the braking force Fb to the rear wheels 60r as the driven wheels is decreased and the decreased portion is complemented by the braking force Fb to the front wheels 60f, and the gripping force of the rear wheels 60r is thereby recovered and the oversteer state can be eliminated.

Also, the distribution of engine braking to the front wheels is limited to a range not exceeding the allowable front/rear force Fxl of the front wheels 60f, and thus it is possible to stabilize the behavior of the vehicle 10.

B. Second Embodiment

B1. Configuration of Vehicle 10A (Difference from First Embodiment)

FIG. 11 is a block diagram of vehicle 10A equipped with an acceleration and deceleration electronic control unit 44a (hereinafter also referred to as an "acceleration and deceleration ECU 44a" or "ECU 44a") which serves as a running control device for vehicles according to a second embodiment of the present disclosure. The same components as those in the first embodiment are denoted by the same reference symbols, and detailed description is omitted.

The vehicle 10A in the second embodiment includes a motor mechanism 150 in addition to the engine mechanism 12 and the brake mechanism 14. The vehicle 10A is what is called a hybrid vehicle, and includes the engine 50 and a running motor 152 (hereinafter also referred to as a "motor 152") as a driving source. The engine 50 and the motor 152 are both disposed on the front side of the vehicle 10A, and the vehicle 10A is a front wheel drive vehicle (FWD vehicle).

In addition to the motor 152, the motor mechanism 150 includes an inverter 154 that controls the output of the motor 152, a battery 156 that supplies power to the motor 152, and SOC sensor 158 that detects the remaining capacity (SOC) of the battery 156.

A calculation unit 72a of the acceleration and deceleration ECU 44a includes a target acceleration and deceleration setting unit 80, an acceleration controller 82, and a deceleration controller 84a. The deceleration controller 84a includes a motor control module 160 in addition to the engine control module 90 and the brake control module 92. The motor control module 160 controls the motor mechanism 150 (the motor 152 and the inverter 154) based on target deceleration Dtar.

In the first embodiment, friction braking and engine braking are available (FIG. 1). In contrast to this, in the second embodiment, regenerative braking using the motor 152 is available in addition to the friction braking and engine braking (FIG. 11).

B2. Setting of Target Acceleration or Deceleration Gxtar in One Pedal Mode

B2-1. Basic Acceleration and Deceleration Characteristics in One Pedal Mode

The basic acceleration and deceleration characteristic in one pedal mode in the second embodiment is the same as in the first embodiment.
(B2-2. Distribution of Target Engine Braking Force Fengtar, Target Frictional Braking Force Ffrtar, and Target Motor Braking Force Fmottar for Requested Braking Force Fbreq)

Similarly to the vehicle 10 in the first embodiment, the vehicle 10A in the second embodiment is a front wheel drive vehicle. Therefore, the distribution of the target frictional braking force Ffrtar and other target braking forces (the target engine braking force Fengtar and the target motor braking force Fmottar) is essentially the same as in the first embodiment.

In the second embodiment, for the portion for which target engine braking force Fengtar is used in the first embodiment, target motor braking force Fmottar is preferentially used and regenerative power is charged to the battery 156. However, when the SOC of the battery 156 is greater than or equal to a threshold value (SOC threshold value), the target engine braking force Fengtar is preferentially used instead of the target motor braking force Fmottar. Also, when the requested braking force Fbreq is not sufficiently provided by the target frictional braking force Ffrtar and the target motor braking force Fmottar, the target engine braking force Fengtar may be allocated.

B3. Effect of Second Embodiment

As described above, according to the second embodiment, the following effects are available in addition to or in replacement of the effects of the first embodiment.

According to the second embodiment, part or all of the requested braking force Fbreq may be provided by the target motor braking force Fmottar. Thus, when the braking force Fb is generated in the vehicle 10A, it is possible to charge regenerative power to the battery 156.

C. Modification

It is to be noted that the present disclosure is not limited to the above-described embodiments and various configurations may be used based on the description herein as will be understood. For instance, the following configurations may be adopted.

C1. Applicable Object

In the first embodiment, the vehicle 10 is an engine vehicle (FIG. 1), and in the second embodiment, the vehicle 10A is a hybrid vehicle (FIG. 11). However, the disclosure is not limited to this when attention is focused on the use of multiple types of brake, for instance. For instance, the vehicles 10, 10A may be an electric vehicle (a fuel cell vehicle is included) other than a hybrid car.

In the above-described embodiments, the vehicles 10, 10A are FWD. However, the disclosure is not limited to this when attention is focused on the use of multiple types of brake, for instance. For instance, the vehicles 10, 10A may be a rear wheel drive vehicle (RWD) or an all wheel drive vehicle (AWD).

When the vehicles 10, 10A are RWD, the relationship between the target front wheel frictional braking force Ffrftar and the target rear wheel frictional braking force Ffrrtar is reversed. Also, when the vehicles 10, 10A are AWD, the braking force Fb which is generated in the drive wheels by engine braking or regenerative braking is affected by the energy efficiency (in other words, the fuel efficiency or power consumption) of the engine 50 or the motor 152 and/or a driving state (limitation such as exhaust gas, rated voltage). For this reason, the braking force Fb is determined regardless of the stability of the vehicles 10, 10A, and braking force distribution which provides optimal distribution of the front/rear force of the wheels 60.

According to the present disclosure, it is possible to adjust the braking force distribution to the front/rear distribution that allows effective use of the braking force Fb of each wheel 60 and to adjust the turning characteristic of the vehicles 10, 10A to an optimal front/rear braking force distribution. Also, when the vehicles 10, 10A are AWD, it is possible to adjust each braking force distribution between engine braking or regenerative braking, and friction braking to the front/rear braking force distribution that exerts the maximum generatable braking force of each one of the vehicles 10, 10A, and to the front/rear braking force distribution that ensures the maximum maneuverability and stability of the vehicles 10, 10A.

In the second embodiment, the one motor 152 is disposed on the front side of the vehicle 10A (FIG. 11). However, the disclosure is not limited to this when attention is focused on the use of friction braking and regenerative braking, for instance. For instance, two rear wheels 60r may be provided with respective motors 152. Alternatively, four motors 152 may be provided as so-called in-wheel motors correspondingly to the wheels 60.

C2. Several Types of Brake

The motor 152 in the second embodiment is a running motor that drives the vehicle 10A. However, the disclosure is not limited to this in view of the use of regenerative braking. For instance, the motor 152 may also be utilized only for application as a motor for power generation (generator).

Regarding the reference distribution (S28 in FIG. 5) in the first embodiment, the case has been described where the ratio α of the front wheel frictional braking force Ffrf to the rear wheel frictional braking force Ffrr is fixed on the precondition that X piping is used in the hydraulic system 54 (the sloped lines 110b, 112 in FIG. 8). In the case where the front/rear piping is used in the hydraulic system 54 instead, a configuration may be adopted in which the fixed ratio α is not provided. Also, the hydraulic system 54 may be able to control the braking force Fb of each wheel 60 individually.

C3. AP Operation Mode

In the above-described embodiments, normal mode and one pedal mode are used as AP operation mode. However, the normal mode may be omitted when attention is focused on the one pedal mode, for instance.

In the one pedal mode in the above-described embodiments, the deceleration region and the acceleration region are set (FIG. 2). However, in addition to the deceleration region and the acceleration region, a constant region (a region in which the target acceleration or deceleration Gxtar is zero or a region in which the target acceleration or deceleration Gxtar is within a predetermined range including zero) as in JP 2006-117020 A may be provided. Alternatively, without setting the target acceleration or deceleration Gxtar, a neutral region that allows inertial running of the vehicles 10, 10A may be provided between the deceleration region and the acceleration region or between the deceleration region and the constant region.

In the one pedal mode in the above-described embodiments, AP operation amount θap and target acceleration or deceleration Gxtar are used with both associated with each other (FIG. 2). However, the disclosure is not limited to this when attention is focused on the function of the deceleration region and the acceleration region, for instance. For instance, AP operation amount θap and target torque Ttar of the engine 50 or the motor 152 may be associated with each other.

C4. Setting of Target Acceleration or Deceleration Gxtar

Although the acceleration and deceleration characteristic (the reference characteristic Cref in FIG. 2) is varied according to the vehicle speed V in the above-described embodiments, the acceleration and deceleration characteristic may not be varied according to the vehicle speed V (for instance, fixed acceleration and deceleration characteristic may be provided regardless of the vehicle speed V).

In the above-described embodiments, the target acceleration or deceleration Gxtar is set to a minimum value (the absolute value of target deceleration Dtar has a maximum value) for AP operation amount θap between zero and a value (threshold value θ1) greater than zero (FIG. 2). However, only when AP operation amount θap is zero, the target acceleration or deceleration Gxtar may be set to a minimum value (the absolute value of target deceleration Dtar has a maximum value).

In the above-described embodiments, the measurement unit of the target acceleration or deceleration Gxtar is "m/s/s". However, the disclosure is not limited to this in view of the control according to the characteristics of multiple types of brake, for instance. For instance, the unit of the target acceleration or deceleration Gxtar may be "N-m/s" (the time differential value of the target torque Ttar of the vehicles 10, 10A).

C5. Setting of Distribution

In the first embodiment, the distribution of the target engine braking force Fengtar and the target frictional braking force Ffrtar are set by the flow chart illustrated in FIG. 5 and other Figures. This is also the case with the second embodiment. However, the disclosure is not limited to this in view of preferable distribution of the target engine braking force Fengtar and the target frictional braking force Ffrtar.

For instance, in the first embodiment, for the distribution adjustment (S42 in FIG. 9) according to turning, the following are checked: whether or not turning operation is performed (S51 in FIG. 10), whether or not the vehicle is in an understeer state (S53), and whether or not the vehicle is in an oversteer state (S55). However, one or more of these determinations may be omitted.

In step S24 in FIG. 5, when the requested braking force Fbreq exceeds the allowable front/rear force Fxl (generatable braking force) limited by the road surface friction coefficient μ (NO in S24 in FIG. 5), the distribution of engine braking is decreased and the distribution of friction braking is increased (S28 to S31). Instead of this, when the braking force Fbf actually generated in the front wheels 60f (the sum of the frictional braking force Ffrf and the engine braking force Feng) exceeds the allowable front/rear force Fxl, the distribution of engine braking may be decreased and the distribution of friction braking may be increased.

In FIG. 4 of the first embodiment, the case where the maneuverability or stability of the vehicle 10 is not ensured (NO in S11) includes the case where anti-lock brake control is in operation by the ABS ECU 46 and the case where turn behavior stabilization control is in operation by the VSA ECU 48. However, for instance, in view of the determination of a case where the maneuverability or stability of the vehicle 10 is not ensured, the determination in step S11 may be made based on the control performed by other electronic control units (ECU). Such control includes, for instance, turning assist control (behavior change control) that assists turning by applying the frictional braking force Ffr to inner wheels before an understeer state occurs. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:
1. A running control device for a vehicle comprising a running controller mounted on a vehicle, wherein in the running controller, at least a deceleration region and an acceleration region are set in a range of operation amount of a single operation element,
  wherein when the operation amount of the operation element is in the deceleration region,
  the running controller
  applies braking to the vehicle by a requested braking force according to the operation amount of the operation element, using:
    (i) friction braking generated by friction due to contact with wheels of the vehicle, and
    (ii) at least one of (a) engine braking generated by an internal-combustion engine or a transmission of the vehicle and (b) regenerative braking generated by an electric motor of the vehicle, and
  the running controller,
  when determining that a behavior of the vehicle during running is in a stable state, increases a distribution of the engine braking or the regenerative braking in entire requested braking force and decreases a distribution of the friction braking, and
  the running controller,
  when determining that the behavior of the vehicle during running is in an unstable state or becomes an unstable state in near future with high probability, decreases the distribution of the engine braking or the regenerative braking in the entire requested braking force and increases the distribution of the friction braking to at least a driven wheel of the wheels,
wherein the running controller
obtains a behavior state amount of the vehicle from a behavior state amount detection device,
the running control device, when determining that the behavior of the vehicle becomes an unstable state in near future with high probability, decreases the distribution of the engine braking or the regenerative braking according to the behavior state amount and increases the distribution of the friction braking according to the behavior state amount, and
the running controller, when determining that the behavior of the vehicle is in an unstable state, sets the distribution of the engine braking or the regenerative braking to zero and generates all the requested braking force by the friction braking,
wherein the running controller includes an operation speed acquisition unit that acquires an operation speed of the operation element, and
increases a rate of shifting the distribution of braking force of the engine braking or the regenerative braking to the distribution of braking force of the friction braking, as the operation speed of the operation element increases.

2. The running control device according to claim 1, wherein the running controller,
when determining that the behavior of the vehicle is in an unstable state or becomes an unstable state in near future with high probability, decreases the distribution of the engine braking or the regenerative braking in the entire requested braking force and increases the distribution of the friction braking to both a drive wheel and the driven wheel, and
adjusts the distribution of the friction braking to the drive wheel and the driven wheel based on a front and rear weight distribution of the vehicle.

3. The running control device according to claim 1, wherein the running controller
obtains a turning state amount of the vehicle from a turning state amount detection device, and
when the obtained turning state amount indicates that the vehicle has changed from straight running to turning, the running controller decreases the distribution of the engine braking or the regenerative braking in the requested braking force and increases the distribution of the friction braking to rear wheels.

4. The running control device according to claim 1, wherein the running control device determines that the behavior of the vehicle is in an unstable state when one of the following conditions is found:
i) slip occurs in one of the wheels,
ii) anti-lock control, which eliminates the slip of the wheels, is in operation by an anti-lock controller, and
iii) behavior change control is in operation by a behavior change controller, the behavior change control being configured to change the behavior of the vehicle by applying braking force to the wheels independently or cooperatively to assist turning of the vehicle or to stabilize the behavior of the vehicle.

5. The running control device according to claim 1, wherein when the requested braking force based on the operation amount of the operation element or a braking force applied to the drive wheel exceeds a generatable braking force limited by a road surface friction coefficient,
the running controller determines that the behavior of the vehicle becomes an unstable state in near future with high probability.

6. The running control device according to claim 1, wherein the vehicle is a front wheel drive vehicle, and the running controller,
when determining that the vehicle is in an understeer state or is supposed to become an understeer state during turning,
calculates a maximum gripping force of the rear wheels based on a rear wheel weight and a road surface friction coefficient,
calculates a requested lateral force of the rear wheels based on a steering angle of the vehicle, and
calculates a front-rear force limited value of the rear wheels using the maximum gripping force and the requested lateral force, and
the running controller, when determining that the vehicle is in an understeer state or is supposed to become an understeer state during turning, decreases the distribution of the engine braking or the regenerative braking in the entire requested braking force and increases the distribution of the friction braking to the rear wheels in a range not exceeding the front-rear force limited value of the rear wheels.

7. The running control device according to claim 1, wherein the vehicle is a front wheel drive vehicle, and the running controller,
when determining that the vehicle is in an oversteer state or is supposed to become an oversteer state during turning,
calculates a maximum gripping force of the front wheels based on a front wheel weight and a road surface friction coefficient,
calculates a requested lateral force of the front wheels based on a steering angle of the vehicle, and
calculates a front-rear force limited value of the front wheels using the maximum gripping force and the requested lateral force, and
the running controller, when determining that the vehicle is in an oversteer state or is supposed to become an oversteer state during turning, decreases the distribution of the friction braking to the rear wheels in the entire requested braking force and increases the distribution of the engine braking or the regenerative braking in a range not exceeding the front-rear force limited value of the front wheels.

8. The running control device according to claim 1, wherein the operation element is an accelerator pedal.

9. The running control device according to claim 1, wherein the deceleration region and the acceleration region are set by setting a threshold value in the range of the operation amount of the single operation element, and providing the deceleration region to the range less than the threshold value and providing the acceleration region to the range higher than the threshold value.

10. A vehicle comprising the running control device according to claim 1.

11. A running control method of a vehicle using a running controller mounted on a vehicle, wherein in the running controller, at least a deceleration region and an acceleration region are set in a range of operation amount of a single operation element, the method comprising:
determining, by using the running controller, whether the operation amount of the operation element is in the deceleration region, and if so, applying, by using the running controller, braking to the vehicle by a requested braking force according to the operation amount of the operation element, by using:
(i) friction braking generated by friction due to contact with wheels of the vehicle, and
(ii) at least one of (a) engine braking generated by an internal-combustion engine or a transmission of the vehicle and (b) regenerative braking generated by an electric motor of the vehicle,
wherein the step of applying further determines whether a behavior of the vehicle during running is in a stable state, and if so, increases a distribution of the engine braking or the regenerative braking in entire requested braking force and decreases a distribution of the friction braking, and
if the behavior of the vehicle during running is in an unstable state or becomes an unstable state in near future with high probability, decreases the distribution of the engine braking or the regenerative braking in the entire requested braking force and increases the distribution of the friction braking to at least a driven wheel of the wheels,
wherein the method further comprises:
obtaining, by using the running controller, a behavior state amount of the vehicle from a behavior state amount detection device,
wherein the step of applying, if the behavior of the vehicle becomes an unstable state in near future with high probability, decreases the distribution of the engine braking or the regenerative braking according to the behavior state amount and increases the distribution of the friction braking according to the behavior state amount, and
if the behavior of the vehicle is in an unstable state, sets the distribution of the engine braking or the regenerative braking to zero and generates all the requested braking force by the friction braking,
wherein the method further comprises acquiring, by using the running controller, an operation speed of the operation element, and
wherein the step of applying increases a rate of shifting the distribution of braking force of the engine braking or the regenerative braking to the distribution of braking force of the friction braking, as the operation speed of the operation element increases.

* * * * *